(12) United States Patent
Wyndham et al.

(10) Patent No.: US 12,487,210 B2
(45) Date of Patent: Dec. 2, 2025

(54) ENCAPSULATED PRE-ANALYTIC WORKFLOWS FOR FLOW-THROUGH DEVICES, LIQUID CHROMATOGRAPHY AND MASS SPECTROMETRIC ANALYSIS

(71) Applicant: Waters Technologies Corporation, Milford, MA (US)

(72) Inventors: Kevin Daniel Wyndham, Upton, MA (US); Darryl W. Brousmiche, Grafton, MA (US)

(73) Assignee: Waters Technologies Corporation, Milford, MA (US)

( * ) Notice: Subject to any disclaimer, the term of this patent is extended or adjusted under 35 U.S.C. 154(b) by 750 days.

(21) Appl. No.: 17/674,227

(22) Filed: Feb. 17, 2022

(65) Prior Publication Data

US 2022/0252553 A1    Aug. 11, 2022

Related U.S. Application Data

(63) Continuation of application No. 16/321,222, filed as application No. PCT/US2017/044391 on Jul. 28, 2017, now Pat. No. 11,280,766.

(60) Provisional application No. 62/367,948, filed on Jul. 28, 2016.

(51) Int. Cl.
| | |
|---|---|
| *G01N 30/00* | (2006.01) |
| *G01N 30/06* | (2006.01) |
| *G01N 30/50* | (2006.01) |
| *G01N 30/72* | (2006.01) |

(Continued)

(52) U.S. Cl.
CPC ............ *G01N 30/06* (2013.01); *G01N 30/50* (2013.01); *G01N 30/72* (2013.01); *G01N 30/7233* (2013.01); *G01N 30/88* (2013.01); *G01N 2030/521* (2013.01); *G01N 2030/524* (2013.01); *G01N 2030/8822* (2013.01)

(58) Field of Classification Search
CPC ...................................................... G01N 30/06
USPC ........................................................... 436/8
See application file for complete search history.

(56) References Cited

U.S. PATENT DOCUMENTS

| | | | |
|---|---|---|---|
| 2004/0175811 A1* | 9/2004 | Kling ..................... | C12Q 1/001 435/174 |
| 2010/0209968 A1* | 8/2010 | Akers .................... | C12N 11/10 435/68.1 |
| 2014/0187501 A1 | 7/2014 | Bilodeau et al. | |

(Continued)

FOREIGN PATENT DOCUMENTS

| | | |
|---|---|---|
| DE | 112013002519 T5 | 1/2015 |
| WO | 2015179848 A1 | 11/2015 |

(Continued)

OTHER PUBLICATIONS

Ahn et al. "Pepsin Immobilized on High-Strength Hybrid Particles for Continuous Flow Online Digestion at 10,000 psi." Anal. Chem. 84.16(2012): 7256-7262.

Bakry et al. "Silica particles encapsulated poly(styrene-divinylbenzene) monolithic stationary phrases for µ-high performance liquid chromatography." J. Chromatogr. A. 1132(2006): 183-189.

(Continued)

*Primary Examiner* — Elizabeth A Robinson
*Assistant Examiner* — Emily R. Berkeley
(74) *Attorney, Agent, or Firm* — WOMBLE BOND DICKINSON (US) LLP; Deborah M. Vernon; Ricardo Joseph

(57) ABSTRACT

This invention relates to encapsulated reagents for sample and workflow preparation prior to chromatographic, spectroscopic or other analytical systems, use thereof, and devices comprising the same.

20 Claims, 13 Drawing Sheets

(51) Int. Cl.
  *G01N 30/88* (2006.01)
  *G01N 30/52* (2006.01)

(56) References Cited

U.S. PATENT DOCUMENTS

| | | |
|---|---|---|
| 2015/0037427 A1 | 2/2015 | Benita et al. |
| 2015/0292988 A1 | 10/2015 | Bharadwaj et al. |
| 2015/0323522 A1 | 11/2015 | Holmes |
| 2015/0368407 A1 | 12/2015 | Zhang et al. |

FOREIGN PATENT DOCUMENTS

| | | |
|---|---|---|
| WO | 2015200717 A2 | 12/2015 |
| WO | 2016069764 A1 | 5/2016 |

OTHER PUBLICATIONS

Extended European Search Report issued in European Patent Application No. 17835347.0 dated Feb. 26, 2020.
International Search Report and Written Opinion issued in International Patent Application No. PCT/US2017/044391 dated Oct. 31, 2017.
Kim et al. "Designed Fabriction of Multifunctional Polymer Nanomedical Platform for Simultaneous Cancer-Targeted Imaging and Magnetically Guided Drug Delivery." Adv. Mater. 20.3(2008): 478-483.
Um et al. "Continuous generation of hydrogel beads and encapsulation of biological materials using a microfluidic droplet-merging channel." Microfluidics Nanofluidics. 5(2008): 541-549.
Zhao et al. "Active scaffolds for on-demand drug and cell delivery." PNAS. 108.1(2011): 67-72.

* cited by examiner

ENCAPSULATED PRE-ANALYTIC WORKFLOWS FOR FLOW-THROUGH DEVICES, LIQUID CHROMATOGRAPHY AND MASS SPECTROMETRIC ANALYSIS

CROSS-REFERENCE TO RELATED APPLICATIONS

This application is a continuation of U.S. patent application Ser. No. 16/321,222, filed Jan. 28, 2019, which is a national phase filing of International Patent Application No. PCT/US2017/044391, filed on Jul. 28, 2017, which claims priority to U.S. Provisional Patent Application No. 62/367,948, filed Jul. 28, 2016. The entire contents and teachings of each of these applications are hereby expressly incorporated herein by reference in their entirety.

BACKGROUND OF THE INVENTION

Liquid chromatography and mass spectrometry are essential tools in quantifying, analyzing and characterizing a wide variety of molecules. Complex molecules, such as biomolecules, require multiple processing steps prior to their introduction to flow through devices for analysis. Low molecular weight substances in biological material and bodily fluids require similarly time-consuming, costly and labor-intensive sample-pretreatment steps. Without such preparation, direct injection of protein-containing samples would result in improper and incomplete analysis as well as the accumulation of unwanted species on the chromatographic support materials thereby irreversibly damaging the chromatography column.

Traditional sample preparation often requires multiple steps of reaction and separation. For example, for a particular protein sample to be completely analyzed for a particular characteristic, it may be necessary to digest the sample with a particular enzyme or surfactant, or both. The digested peptides may then need to be labeled in some way to allow for proper detection. In each of these steps, samples are allowed to react with the particular reagent and then must be separated to remove unwanted materials and reagents prior to chromatographic or spectroscopic analysis.

As an example, a protein digest workflow that uses an affinity capture step requires multiple reagent addition steps, vortexing, centrifuging and heating steps. In a manual mode this requires the preparation of reagents, multiple additions and liquid transfer steps, movement of plates to and from heating blocks, centrifuges, and vortex mixers. This type of manual workflow can be labor intensive and can result in high variability, difficulty transferring and replicating results. The use of automation can be used to improve reproducibility and reduce user involvement. However, automation requires a significant investment in equipment, supporting infrastructure and requires user generated scripts. As such the use of automation is often only available in high volume testing laboratories.

As such, there remains a need for a moderate throughput device that allows for a singular flow-through workflow device which allows for robust and simplified workflows.

BRIEF SUMMARY OF THE INVENTION

This invention relates to encapsulated reagents for sample and workflow preparation, use thereof, and devices comprising the same. Workflows which can be used in the materials and methods of the invention include, but are not limited to, reduction or alkylation reagent workflows, protein digest workflows, proteolytic enzyme and protease workflows, and workflows for the analysis of amino acids, glycoproteins, pesticides and polar compound analysis.

The use of encapsulated reagents for digestion, hydrolysis and denaturation (e.g., trypsin, PNGase F, pepsin, IdeS, IdeZ) improves stability and flowability of these materials. The use of encapsulated reagents for hydrolytically unstable and reactive molecules (e.g., WATERS TECHNOLOGIES CORPORATION ACCQ•FLUOR™ labeling agent, WATERS TECHNOLOGIES CORPORATION RAPIFLUOR-MS™ tagging reagent, acid-labile surfactants, acyl chlorides, chloroformate esters, succinimydl carbonates, esters and isocyanates) allows for improved stability and introduction at specific points within a workflow. The use of encapsulated reagents for reactive agents such as reduction agents and alkylating agents (e.g., dithiothreitol (DTT), iodoacetamide, 2-mercaptoehtanol, 2-mercaptoethylamine HCl, Tris (2-carboxyethyl) phosphine hydrochloride, 4-vinylpyridine, haloacyl reagents (e.g. acetylchloride), N-ethylmaleimide, bromoalkanes, acrylamide, sodium borohydride, sodiumcyanoborohydride and other similar reducing agents (e.g. metal hydrides) allows for similarly improved stability and introduction at specific points within a workflow. Encapsulated reagents can further be used for stabilizing thermally sensitive standards in the absence of a singular workflow device. Encapsulated reagents can further be used for stabilizing workflow reagents containing sulfur or otherwise having a strong odor. The use of encapsulated reagents for such compounds allows for the odor to be masked during sample preparation and analysis while maintaining the efficacy and efficiency of the reagents. Encapsulated reagents can further be used to minimize harmful exposure in the handling of toxic reagents.

Some reagents, standards, isotopically labeled standards, modifiers, and enzymes are known to be unstable, deactivate or react under ambient conditions, in the presence of co-solvents (such as water), or are of variable concentration due to insolubility or adsorption. Similarly, some enzymes are known to lose some or all activity due to a process of autolysis, or self-digestion. The encapsulation of reagents, standards, and enzymes allows for improved stability, transportability, and allows for the introduction of the target group into the workflow in either a time released or specific manner.

As such, one aspect of the invention provides an encapsulated workflow reagent comprising an encapsulating material and a workflow reagent encapsulated within the encapsulating material.

In certain embodiments of the encapsulated workflow reagent of the invention, the encapsulating material is attached to a surface of a scaffolding material. In certain embodiments the encapsulating material is bound to the scaffolding material by coating, by covalent bonding, by ionic bonding, through a linker, or a combination thereof.

In other embodiments of the encapsulated workflow reagent of the invention, the encapsulating material is one or more polymers capable of providing a controlled release of the workflow reagents. In particular embodiments, the controlled release is such that the reagent is released over a period of time at a controlled rate. In other embodiments, the controlled release is such that the reagent is released at a particular point of the workflow process.

In still other embodiments of the encapsulated workflow reagent of the invention, the scaffolding material is a solid, a porous solid, a non-porous solid, a macroporous solid, a mesoporous solid, a microporous solid, a nanoporous solid, a superficially porous solid, a perfusive solid, a controlled pore solid, an amorphous solid, a radially aligned porous solid, a non-radially aligned porous solid, a circular ordered porous solid, a crystalline solid, a sintered solid, a liquid, a hydrogel, an aerogel, a xerogel, a cryo-gel, a soft-gel, a gel-like material, a wall-anchored monolith, a wall-anchored polymeric high internal phase material, a particle, a monolith, a membrane, a poly-HIPE, a mesh, a fiber, a screen, an anodized filter, or a frit-like material.

In certain embodiments, workflow reagents can be bound or adsorbed to a chromatographic material. In such embodiments, the entire workflow reagent including the chromatographic material may be encapsulated by the encapsulating material. Thus, in certain embodiments, the encapsulated workflow reagent encapsulated within the encapsulating material is attached to the surface of a chromatographic material. In such embodiments, the chromatographic material is a solid, a porous solid, a non-porous solid, a macroporous solid, a mesoporous solid, a microporous solid, a nanoporous solid, a superficially porous solid, a perfusive solid, a controlled pore solid, an amorphous solid, a radially aligned porous solid, a non-radially aligned porous solid, a circular ordered porous solid, a crystalline solid, a sintered solid, a hydrogel, an aerogel, a xerogel, a cryo-gel, a soft-gel, a gel-like material, a particle material, or a monolith material. In other embodiments, the chromatographic materials including (but not limited to): polymer materials, silica materials, hybrid organic/inorganic materials, ion-exchange materials, metal impregnated materials, activated carbon, silica, Fluorosil, reversed-phase material, hydrophilic interaction material, hydrophobic interaction materials, desalting materials, restricted access material, or size exclusion material. In certain embodiments in which a workflow reagent and a chromatographic material are both encapsulated by an encapsulating material, the encapsulating material may then further be bound to a scaffolding material.

In particular embodiments of the encapsulated workflow reagent of the invention, the encapsulated workflow reagent material has the formula $$[(B)-(Y)_n]_o-EM \qquad \text{(Formula I)}$$

EM represents the encapsulating material;
B represents a scaffolding material;
Y is a linker group between the encapsulating material and a surface of the scaffolding material;
o is an integer greater than or equal to 0; and
n is an integer greater than or equal to 1.

In some embodiments having a linker group, the linker group is of the formula represented by Formula II

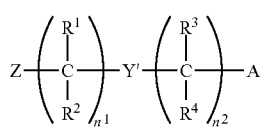

Formula II wherein
$n^1$ an integer from 0-30;
$n^2$ an integer from 0-30;
each occurrence of $R^1$, $R^2$, $R^3$ and $R^4$ independently represents hydrogen, fluoro, methyl, ethyl, n-butyl, t-butyl, i-propyl, lower alkyl, a protected or deprotected alcohol, a zwiterion, or a group Z;

Z represents:
a) a surface attachment group having Formula III:

$$(B^1)_x(R^5)_y(R^6)_z\text{Si}— \qquad \text{Formula III}$$

wherein x is an integer from 1-3,
y is an integer from 0-2,
z is an integer from 0-2,
and x+y+z=3
each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwiterion group;
$B^1$ represents $—OR^7$, $—NR^{7'}R^{7''}$, $—OSO_2CF_3$, or $—Cl$; where each of $R^7$, $R^{7'}$ and $R^{7''}$ represents hydrogen, methyl, ethyl, n-butyl, iso-butyl, tert-butyl, iso-propyl, thexyl, phenyl, branched alkyl or lower alkyl;
b) an attachment to a surface group through a direct carbon-carbon bond formation or through a heteroatom, ester, ether, thioether, amine, amide, imide, urea, carbonate, carbamate, heterocycle, triazole, or urethane linkage; or
c) an adsorbed, surface group that is not covalently attached to the surface of the material;

Y' represents a direct bond; a heteroatom linkage; an ester linkage; an ether linkage; an thioether linkage; an amine linkage; an amide linkage; an imide linkage; a urea linkage; a thiourea linkage; a carbonate linkage; a carbamate linkage; a heterocycle linkage; a triazole linkage; a urethane linkage; a diol linkage; a polyol linkage; an oligomer of styrene, ethylene glycol, or propylene glycol; a polymer of styrene, ethylene glycol, or propylene glycol; a carbohydrate group, a multi-antennary carbohydrates, a dendrimer or dendrigraphs, or a zwitterion group; and A represents attachment to the encapsulating material by a ionic group, non-covalently attachment group or by a direct bond including (but not limited to): a heteroatom linkage; an ester linkage; an ether linkage; an thioether linkage; an amine linkage; an amide linkage; an imide linkage; a urea linkage; a thiourea linkage; a carbonate linkage; a carbamate linkage; a heterocycle linkage; a triazole linkage; a urethane linkage; a diol linkage; a polyol linkage; an oligomer of styrene, ethylene glycol, or propylene glycol; a polymer of styrene, ethylene glycol, or propylene glycol; a carbohydrate group, a multi-antennary carbohydrates, a dendrimer or dendrigraphs, or a zwitterion group.

In certain embodiments of the encapsulated workflow reagent of the invention, the workflow reagent is an enzyme, a surfactant, a labeling reagent, a reactive compound, an internal standard, an external standard or a combination thereof.

In some embodiments of the encapsulated workflow reagent of the invention, the workflow reagent is released over a period of time. In such embodiments, the encapsulated workflow reagent of the invention is released in proportion to the amount of sample which has been exposed to the encapsulated workflow reagent of the invention. In certain embodiments, the encapsulated workflow reagent of the invention is released immediately upon exposing the encapsulated workflow reagent of the invention to a sample.

In one embodiment of the encapsulated workflow reagent of the invention, the primary encapsulation shell further encapsulates one or more additional encapsulation shells comprising one or more independent workflow reagents.

In certain embodiments, the one or more additional encapsulation shells are in the form of microcapsules separately contained within the primary encapsulation shell. In certain embodiments, the one or more additional encapsulation shells are in the form of concentric encapsulation shells such that the workflow reagents are sequentially released.

In certain embodiments having one or more additional encapsulation shells such that one or more encapsulation shells—the inner shells—are encapsulated within another encapsulation shell—the outer shell, each encapsulation shell has an inner surface and an outer surface such that the outer surface of one or more inner encapsulation shells is bound to the inner surface of an outer encapsulation shell. In particular embodiments having one or more additional encapsulation shells, all of the encapsulation shells are bound such that the shells remain tethered together upon release of the various workflow reagents and, if present, to the scaffolding material.

In other embodiments, the one or more additional workflow reagents are released at the same time. In still other embodiments, the one or more additional workflow reagents are released sequentially.

In another aspect, the invention provides a sample preparation device comprising an encapsulated workflow reagent according to the invention. In certain embodiments, the device is selected from the group consisting of chromatographic columns, thin layer plates, filtration membranes, sample cleanup devices and microtiter plates; packings for HPLC columns; solid phase extraction (SPE); ion-exchange chromatography; magnetic bead applications; affinity chromatographic and SPE sorbents; sequestering reagents; solid supports for combinatorial chemistry; solid supports for oligosaccharide, polypeptides, and/or oligonucleotide synthesis; solid supported biological assays; capillary biological assay devices for mass spectrometry, templates for controlled large pore polymer films; capillary chromatography; electrokinetic pump packing materials; packing materials for microfluidic devices; polymer additives; catalysis supports; and packings materials for microchip separation devices.

In still another aspect, the invention provides a method for a method for preparing a sample for analysis comprising the steps of:
 providing a sample preparation device comprising an encapsulated workflow reagent according to the invention;
 introducing a sample to the sample preparation material; and
 allowing the sample to remain with the sample preparation material for sufficient time to release the encapsulated workflow reagent.

In certain embodiments of the methods of the invention, the method further comprises adding a pore forming agent to induce release of the encapsulated workflow reagent.

In certain other embodiments, the method further comprises contacting an encapsulated workflow reagent with a solvent to induce release of the encapsulated workflow reagent. In particular embodiments, the method comprises subjecting an encapsulated workflow reagent with a change in pH to induce release of the encapsulated workflow reagent. In other particular embodiments, the method comprises subjecting an encapsulated workflow reagent to a change in ionization to induce release of the encapsulated workflow reagent. In other particular embodiments, the method comprises subjecting an encapsulated workflow reagent to a change in counterion element, counterion charge, or both to induce release of the encapsulated workflow reagent. In still other embodiments in which a solvent is used to release the encapsulated workflow reagent, the solvent is an organic solvent, an aqueous solvent, an aliphatic solvent, an aromatic solvent, an oxygenated solvent, or a halogenated solvent, or water.

In certain other embodiments, the method further comprises subjecting an encapsulated workflow reagent a change in temperature to induce release of the encapsulated workflow reagent.

In certain other embodiments, the method further comprises subjecting an encapsulated workflow reagent a change in ionization to induce release of the encapsulated workflow reagent.

In certain other embodiments, the method comprises more than one means to induce release of the encapsulated workflow reagent.

DETAILED DESCRIPTION OF THE INVENTION

Figure 1:
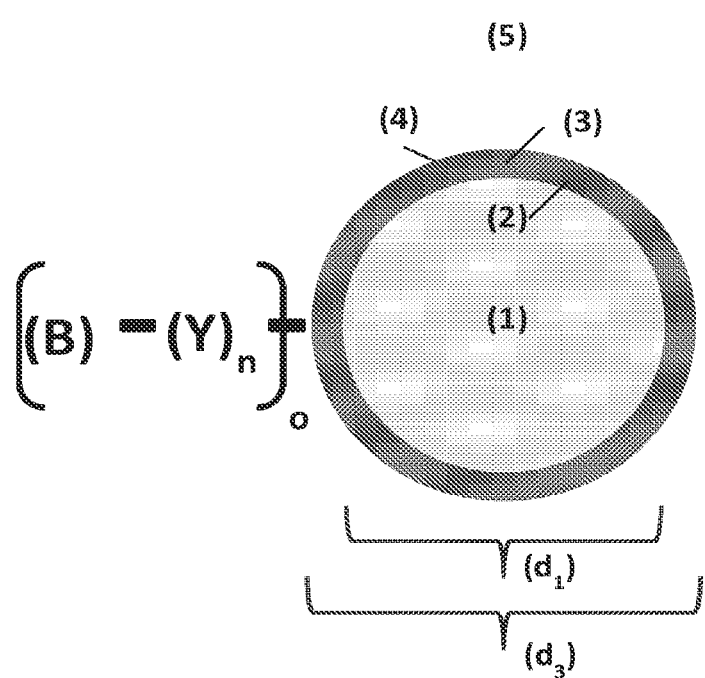
FIG. 1 is a cross sectional depiction of an encapsulated workflow material (5) of the invention in which B is a scaffolding material, Y is a linker group attached to the external surface of the encapsulation shell, (1) represents the internal cavity or void in which a workflow reagent is encapsulated, optionally with other carrier materials or excipients; (2) represents the internal surface of the encapsulation shell; (3) represents the encapsulation shell; (4) represents the external surface of the encapsulation shell; (d1) is the internal diameter of the encapsulation shell and (d3) is the external diameter of the encapsulation shell. In certain embodiments, (1) represents a solid, porous or substantially nonporous material having a surface onto which the workflow reagent is bound or adsorbed onto.

The present invention provides novel workflow materials, e.g., for chromatographic separations, processes and separations devices containing the chromatographic material. The present invention will be more fully illustrated by reference to the definitions set forth below.

"Hybrid", including "hybrid inorganic/organic material," includes inorganic-based structures wherein an organic functionality is integral to both the internal or "skeletal" inorganic structure as well as the hybrid material surface. The inorganic portion of the hybrid material may be, e.g., alumina, silica, titanium, cerium, or "Hybrid" includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium oxides, or ceramic material; in an advantageous embodiment, the inorganic portion of the hybrid material is silica. As noted above, exemplary hybrid materials are shown in U.S. Pat. Nos. 4,017,528, 6,528,167, 6,686,035 and 7,175,913 and International Application Publication No. WO2008/103423.

The term "alicyclic group" includes closed ring structures of three or more carbon atoms. Alicyclic groups include cycloparaffins or naphthenes which are saturated cyclic hydrocarbons, cycloolefins, which are unsaturated with two or more double bonds, and cycloacetylenes which have a triple bond. They do not include aromatic groups. Examples of cycloparaffins include cyclopropane, cyclohexane and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, —CF3, —CN, or the like.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl and the like. As used herein, the term "nitro" means —NO2; the term "halogen" designates —F, —Cl, —Br or —I; the term "thiol" means SH; and the term "hydroxyl" means —OH. Thus, the term "alkylamino" as used herein means an alkyl group, as defined above, having an amino group attached thereto. Suitable alkylamino groups include groups having 1 to about 12 carbon atoms, advantageously from 1 to about 6 carbon atoms. The term "alkylthio" refers to an alkyl group, as defined above, having a sulfhydryl group attached thereto. Suitable alkylthio groups include groups having 1 to about 12 carbon atoms, advantageously from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, advantageously 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, advantageously from 1 to about 6 carbon atoms.

The term "alkyl" includes saturated aliphatic groups, including straight-chain alkyl groups, branched-chain alkyl groups, cycloalkyl (alicyclic) groups, alkyl substituted cycloalkyl groups and cycloalkyl substituted alkyl groups. In certain embodiments, a straight chain or branched chain alkyl has 30 or fewer carbon atoms in its backbone, e.g., C1-C30 for straight chain or C3-C30 for branched chain. In certain embodiments, a straight chain or branched chain alkyl has 20 or fewer carbon atoms in its backbone, e.g., C1-C20 for straight chain or C3-C20 for branched chain, and more advantageously 18 or fewer. Likewise, advantageous cycloalkyls have from 4-10 carbon atoms in their ring structure and more advantageously have 4-7 carbon atoms in the ring structure. The term "lower alkyl" refers to alkyl groups having from 1 to 6 carbons in the chain and to cycloalkyls having from 3 to 6 carbons in the ring structure.

Moreover, the term "alkyl" (including "lower alkyl") as used throughout the specification and Claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "amino," as used herein, refers to an unsubstituted or substituted moiety of the formula —NRaRb, in which Ra and Rb are each independently hydrogen, alkyl, aryl, or heterocyclyl, or Ra and Rb, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of Ra and Rb, is further substituted with an amino group.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —CF3, —CN, or the like.

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine and the like. Aryl groups also include polycyclic fused aromatic groups such as naphthyl, quinolyl, indolyl and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "ceramic precursor"" is intended include any compound that results in the formation of a ceramic material.

The language "chromatographically-enhancing pore geometry" includes the geometry of the pore configuration of the presently-disclosed materials, which has been found to enhance the chromatographic separation ability of the material, e.g., as distinguished from other chromatographic media in the art. For example, a geometry can be formed, selected or constructed, and various properties and/or factors can be used to determine whether the chromatographic separations ability of the material has been "enhanced", e.g., as compared to a geometry known or conventionally used in the art. Examples of these factors include high separation efficiency, longer column life and high mass transfer properties (as evidenced by, e.g., reduced band spreading and good peak shape.) These properties can be measured or observed using art-recognized techniques. For example, the chromatographically-enhancing pore geometry of the present porous materials is distinguished from the prior art particles by the absence of "ink bottle" or "shell shaped" pore geometry or morphology, both of which are undesirable because they, e.g., reduce mass transfer rates, leading to lower efficiencies. Chromatographically-enhancing pore geometry is found in porous materials containing only a small population of micropores. Porous materials with such a low micropore surface area (MSA) give chromatographic enhancements including high separation efficiency and good mass transfer properties (as evidenced by, e.g., reduced band spreading and good peak shape). Micropore surface area (MSA) is defined as the surface area in pores with diameters less than or equal to 34 Å, determined by multipoint nitrogen sorption analysis from the adsorption leg of the isotherm using the BJH method. As used herein, the acronyms "MSA" and "MPA" are used interchangeably to denote "micropore surface area".

The term "functionalizing group" includes organic functional groups which impart a certain chromatographic functionality to a chromatographic stationary phase.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —CF3, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "metal oxide precursor" is intended include any compound that contains a metal and results in the formation of a metal oxide, e.g., alumina, silica, titanium oxide, zirconium oxide, or cerium oxide.

The term "monolith" is intended to include a collection of individual particles packed into a bed formation, in which the shape and morphology of the individual particles are maintained. The particles are advantageously packed using a material that binds the particles together. Any number of binding materials that are well known in the art can be used such as, for example, linear or cross-linked polymers of divinylbenzene, methacrylate, urethanes, alkenes, alkynes, amines, amides, isocyanates, or epoxy groups, as well as condensation reactions of organoalkoxysilanes, tetraalkoxysilanes, polyorganoalkoxysiloxanes, polyethoxysiloxanes, and ceramic precursors. In certain embodiments, the term "monolith" also includes hybrid monoliths made by other methods, such as hybrid monoliths detailed in U.S. Pat. No. 7,250,214; hybrid monoliths prepared from the condensation of one or more monomers that contain 0-99 mole percent silica (e.g., SiO2); hybrid monoliths prepared from coalesced porous inorganic/organic particles; hybrid monoliths that have a chromatographically-enhancing pore geometry; hybrid monoliths that do not have a chromatographically-enhancing pore geometry; hybrid monoliths that have ordered pore structure; hybrid monoliths that have non-periodic pore structure; hybrid monoliths that have non-crystalline or amorphous molecular ordering; hybrid monoliths that have crystalline domains or regions; hybrid monoliths with a variety of different macropore and mesopore properties; and hybrid monoliths in a variety of different aspect ratios. In certain embodiments, the term "monolith" also includes inorganic monoliths, such as those described in G. Guiochon/J. Chromatogr. A 1168 (2007) 101-168.

The term "nanoparticle" is a microscopic particle/grain or microscopic member of a powder/nanopowder with at least one dimension less than about 100 nm, e.g., a diameter or particle thickness of less than about 100 nm (0.1 µm), which may be crystalline or noncrystalline. Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 nm in diameter, e.g., less than or equal to 50 nm in diameter, e.g., less than or equal to 20 nm in diameter.

"Surface modifiers" include (typically) organic functional groups which impart a certain chromatographic functionality to a chromatographic stationary phase. The porous inorganic/organic hybrid particles possess both organic groups and silanol groups which may additionally be substituted or derivatized with a surface modifier.

The language "surface modified" is used herein to describe the composite material of the present invention that possess both organic groups and silanol groups which may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later cross-linking, imparting the chemical character of the surface modifier to the base material. In one embodiment, the organic groups of a hybrid material, e.g., particle, react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. A variety of synthetic transformations are well known in the literature, see, e.g., March, J. Advanced Organic Chemistry, 3rd Edition, Wiley, New York, 1985.

The language, "composite material" and the term "composite" are used interchangeably herein to describe the engineered materials of the invention composed of one or more components described herein in combination with dispersed nanoparticles, wherein each component/nanoparticle remains separate and distinct on a macroscopic level within the finished structure. The composite material of the present invention is independent of form, and may be monolithic or particulate in nature. Moreover, a short-hand convention may be used to describe a composite material containing a dispersed nanoparticle, Np/(A)w(B)x(C)y, and may be understood as follows: the symbolic representation to the left of the slash mark represents the dispersed nanoparticle, and the symbolic representations to the right of the slash mark represent the components that comprise the material that the nanoparticle (noted on the left of the slash mark) is dispersed within. In certain embodiments, the composite materials of the present invention may be nanocomposites, which are known to include, at least, for example, nano/nano-type, intra-type, inter-type, and intra/inter-type. (Nanocomposites Science and Technology, edited by P. M. Ajayan, L. S. Schadler, P. V. Braun, Wiley-VCH (Weinheim, Germany), 2003).

As used herein, the terms "aggregates" and "agglomerates" refer to undesired materials generated in the processes of the invention that are larger than the 90 vol % of the target particle size distribution. Aggregates and/or agglomerates can form from imperfections of the core material, improper mixing or dispersion in the process, or excessive forces during workup. Aggregates and agglomerates can impact the efficiency, permeability, reproducibility and robustness of packed beds within chromatographic columns. It is difficult to optimally pack a chromatographic column with materials having an elevated amount of aggregates and agglomerates. Aggregates and agglomerates can break apart within a packed bed structure when exposed to high pressures and shears. This can result in a mechanical instability of the packed bed and the result of a void on the top of the column. This breaking of aggregates and agglomerates can also result in the generation of fines. Aggregates and agglomerates can be removed by classification.

As used herein, the term "fines" refers to undesired materials generated in the processes of the invention that are below the 10 vol % of the target particle size distribution. Fines can be formed from reseeding events or from particle breakage. Resulting fines can be nonporous or fully porous. Often fines are substantially smaller than the 10 vol % of the target particle size distribution. Often fines are <1 um in size. Very small fines can cause problems in chromatography in that the percolate through the packed bed and get stuck in the outlet frit. This generates increased column pressure. Alternatively fines small enough to percolate through the packed bed and outlet frit can result in problems with detectors and can contaminate a product. Problems with detector include clogging flow channels, blocking detector windows, and anomalous detector readings. Such issues can reduce the lifetime of a detector and can require extensive cleaning protocols. Such issues can also impact the precision, accuracy, reliability, reproducibility, and robustness of analytical data generated. Fines can be removed by classification.

As used herein, the term "substantially nonporous" refers to a material which, although porous, is impermeable or otherwise functions as a non-porous material. Such a substantially nonporous material has a pore volume of less than about 0.10 cc/g.

The term "analyte" is a component, substance or chemical constituent that is of interest in an analytical procedure. Particular examples may include, but not limited to, drugs, pesticides, polar compounds, herbicides, toxins and environmental pollutants, metal-organic compounds, biologically active compounds such as metabolites, proteins, peptides, hormones, polynucleotides, vitamins, cofactors, metabolites, lipids and carbohydrates.

The term "sample", as used herein, refers to a complex fluid mixture containing soluble and insoluble components. Particular examples include, but are not limited to, food samples (e.g., milk, a fortified food matrix), biological samples including a sample from human or animals (e.g., blood, blood plasma, urine, mucosal tissue secretions, tears, semen, and breast milk) and environmental samples (e.g., ground water, waste waters, soil, and sea, river, pond, or bay water). The sample may further include macromolecules, e.g., substances, such as biopolymers, e.g., proteins, e.g., proteolytic proteins or lipophilic proteins, such as receptors and other membrane-bound proteins, and peptides. The sample may further include one or more lipid, or phospholipid molecules.

The term "matrix" as used herein, refers to the components of a sample other than the analyte of interest. When the analytes are separated, extracted and analyzed, the matrix may have a substantial interference with the analyte during analysis by ESI, or any other technique using nebulization and ionization of sample components prior to detection such as APCI and APPI.

The term "matrix interference" as used herein, refers to those components of the sample that produce a substantial signal enhancement or suppression with the analytes during analysis by mass spectrometry. A substantial signal enhancement or suppression that interferes with analyte quantitation is also termed a substantial interference. In certain embodiments, the "substantial interference" refers to a matrix effect that is greater than 20% for targeted analyses and 50% for screening analyses. Matrix interferences lower than these are considered acceptable if the majority of analytes in an analysis have matrix effect below this threshold.

The term "targeted analysis" as used herein, refers to the analysis of a predetermined set of analytes expected to be present in the samples being analyzed. Targeted analyses typically do not rely on full scan mode data from a MS but from selected ion monitoring of the target ions of interest. An example of a targeted analysis is quantitating Tacrolimus, an immunosuppressive drug used after organ transplants, given to reduce the risk of rejection. A discrete concentration value is reported for these analyses.

The term "screening analysis" as used herein, refers to the analysis of a large grouping of analytes that may or may not be present in the samples being analyzed. An example of a screening analysis is determining if pesticides are present in foods. These reports contain information on the presence of analytes at or above a certain threshold.

The term "matrix effect" or "ME" as used herein, refers to a quantified enhancement or suppression of analyte signal. The matrix effect is calculated for analyte of interest the following formula:

$$\text{Matrix Effects} = \left(\frac{\text{(analyte area counts in the presence of matrix)}}{\text{(analyte area counts in the absence of matrix)}} - 1\right) \times 100\%$$

In certain embodiments, the matrix effect is calculated using the following formula:

$$\text{Matrix Effects} = \left(\left(\frac{\text{Response (post-spiked extracted sample)}}{\text{Response (Solvent standard)}}\right) - 1\right) \times 100\%$$

Matrix effects may be caused by, but not limited to, small molecules, proteins, peptides, polymers, surfactants, particulates, cells, lipids or phospholipids, drug product excipients and salts.

The phrase "solid-phase extraction (SPE) method or protocol" as used herein, refers to a procedure comprising of the following steps:

1. Conditioning: the addition of an organic containing wetting solvent, typically methanol, which is required for the subsequent use of non-water wettable sorbents like Silica C18.
2. Equilibrating the sorbent: the addition of water or buffer to displace the organic solvent used to condition the sorbent for use. The removal of the conditioning solution is required for retention to occur in the following step.
3. Loading the sample: the addition of a sample as received or prepared by dilution and/or, centrifugation or filtration.
4. Washing the sorbent: the addition of a solution able to remove matrix salts, proteins, in particular albumin, and other polar matrix interferences. The polarity of the wash solution is such that retention of analytes of interest on the sorbent is maintained. The wash steps may be repeated multiple times to remove specific interferences.
5. Eluting the analytes: the addition of a solution that elutes the analytes of interest from the sorbent while minimizing the co-elution of matrix interferences.

The term "recovery" as used herein, refers to the amount of analyte recovered from the extracted sample. The calculation used for recovery is shown below:

$$Recovery = \left(\frac{\text{Pre-spiked sample response}}{\text{Post-spiked sample response}}\right) \times 100\%$$

The language "biological sample" refers to any solution or extract containing a molecule or mixture of molecules that comprises at least one biomolecule that is subjected to extraction or analysis that originated from a biological source (such as, humans and animals). Biological samples are intended to include crude or purified, e.g., isolated or commercially obtained, samples. Biological sample may be, but are not limited to, inclusion bodies, biological fluids, biological tissues, biological matrices, embedded tissue samples, cells (e.g., one or more types of cells), and cell culture supernatants. Particular examples may include blood plasma, urine, cerebrospinal fluid, synovial fluid and other biological fluids, including extracts of tissues, such as liver tissue, muscle tissue, brain tissue and heart tissue and the like.

The language "biological matrices" is intended to include anything that a cell contains or makes, e.g., bone, inclusion bodies, blood components, cell debris, e.g., cell lysates, etc.

The language "biological fluid" as used herein is intended to include fluids that are obtained from a biological source. Exemplary biological fluids include, but are not limited to, blood, blood plasma, urine, spinal fluid, mucosal tissue secretions, tears, interstitial fluid, synovial fluid, semen, and breast milk.

The term "chromatographic" process as used herein refers to a process including a physical method of separation that distributes components to separate between two phases, one stationary (stationary phase), the other (the mobile phase) moving in a definite direction.

The term "eluate" as used herein refers to a mobile phase leaving the sample preparation device or column. In certain embodiments, the eluate may include an analyte of interest or the eluate may not include the analyte which may be retained by a resin or a matrix of the resin. In such instances, the resin or matrix of the resin may be further eluted in a subsequent step to elute the retained analyte of interest.

The term "solid phase extraction (SPE)" refers to a frequently used chromatographic technique for isolating analytes from the sample for quantitative analysis, especially together with high performance liquid chromatography (HPLC) or gas chromatography (GC) (McDonald and Bouvier, eds. Solid Phase Extraction Applications Guide and Bibliography, sixth edition, Milford, MA: Waters (1995)). Solid phase extraction can be advantageous to separate a component of interest in a complex solution from potentially interfering elements and to concentrate the target analytes to the level of sufficient detection and measurement. For example, solid phase extraction has been widely utilized in preparing food or beverage samples, environmental samples and pharmaceutical agents or metabolites for analysis.

The term "water-wettable" as used herein, describes a material which is solvated, partially or completely, by water. The water-wettable material engages in energetically favorable or attractive interactions with water molecules, and thus, maintains its capability for high retention and excellent recoveries even if the sorbent runs dry, which means there is no need to take extraordinary steps to keep the sorbent beds from drying out during the critical steps prior to sample loading. Water-wettable materials are exemplified, but not limited to, those described in U.S. Pat. No. 5,882,521. As observed in the examples of U.S. Pat. No. 5,882,521 sorbents that do not engage in favorable energetics or interactions with water require an organic conditioning followed by an aqueous equilibration in order to maintain retention of analytes of interest during sample loading. In certain embodiments, when water-wettable material is solvated partially, less than about 1%, less than about 3%, less than about 5%, less than about 7%, less than about 10%, less than about 15%, less than about 20%, less than about 25%, less than about 30%, less than about 35%, less than about 40%, less than about 45 less than about 50%,%, less than about 55%, less than about 60%, less than about 65%, less than about 70%, less than about 75%, less than about 80%, less than about 85%, less than about 90%, less than about 95%, or less than about 99% of the material may be solvated or wet by water.

The term "monomer", as used herein, refers to both a molecule comprising one or more polymerizable functional groups prior to polymerization, and a repeating unit of a polymer. A polymer can comprise two or more different monomers, in which case it can also be referred to as a copolymer. The "mole percent" of a given monomer which a copolymer comprises is the mole fraction, expressed as a percent, of the monomer of interest relative to the total moles of the various (two or more) monomers which compose the copolymer.

The term "sorption" or "sorbing" describes the ability of a material to take up and hold another material by absorption or adsorption. Without adsorption of matrix components and analytes of interest on the surface of a sorbent material, retention would not be maintained when the system is subjected to the flow of certain fluids.

The term "sorbent" refers to a material or molecule capable of sorption or sorbing. In certain embodiments, the sorbent may adsorb either analytes or other matrix molecules.

As used herein, the term "hydrophobic" refers to a physical or chemical property which repels water or polar molecules. In certain embodiments, the hydrophobic group in a resin makes a substantial interaction or affinity with hydrophobic analytes or matrix in a sample and adsorbs hydrophobic species.

As used herein, the term "hydrophilic" refers to a physical or chemical property which favors water or polar molecules. In certain embodiments, the hydrophilic group in a resin makes a substantial interaction with hydrophilic or polar analytes or matrix in a sample and adsorbs hydrophilic species.

The term "phospholipid" refers to a lipid which contains a phosphate group and one or more of glyceride. The phospholipids are major components of cell membranes in a form of lipid bilayers. Therefore, the phospholipids are mostly included in biological samples and food and other by-products produced from animal products. In certain embodiments, the phospholipids may cause a matrix effect to substantially disturb analytical qualification and quantitation because they may interact or adhere to analytes. As such, it is preferred to remove phospholipid prior to analysis.

The terms "analysis" or "analyzing" are used interchangeably and refer to any of the various methods of separating, detecting, isolating, purifying, solubilizing, detecting, quantifying and/or characterizing chemical or biological composition. In certain embodiments the analysis may also refer to the various methods of determining the degree of purification of a sample. Examples of the various methods include, but are not limited to, solid phase extraction, solid phase micro extraction, electrophoresis, mass spectrometry, e.g., MALDI-MS or ESI, liquid chromatography, e.g., high performance, e.g., reverse phase, normal phase, or size exclusion, ion-pair liquid chromatography, liquid-liquid extraction, e.g., accelerated fluid extraction, supercritical fluid extraction, microwave-assisted extraction, membrane extraction, soxhlet extraction, precipitation, clarification, electrochemical detection, staining, elemental analysis, Edmund degradation, nuclear magnetic resonance, infrared analysis, flow injection analysis, capillary electrochromatography, ultraviolet detection, and combinations thereof.

The term "mass spectrometric detection" refers to any of the various methods of mass spectroscopy. Examples include, but are not limited to, electrospray ionization (ESI), surface desorption ionization, and atmospheric pressure chemical ionization (APCI). In certain embodiments, mass spectrometric detection also includes the use of a tandem mass spectrometer, a quadrupole time-of-flight mass spectrometer, or a magnetic sector mass spectrometer.

The language "high-purity analyte/sample" refers to a prepared or extracted analyte which may have reduced contamination and/or non-diminished chromatographic properties prior to quantitative or qualitative analysis, such as chromatography and mass spectroscopy.

The term "substantially", as in "substantially higher," "substantially greater" or "substantially improved" as used herein refers to an increase of an effect of about 10%, about 15%, about 20%, about 25%, about 30%, about 35%, about 40%, about 45%, about 50%, about 55%, about 60%, about 65%, about 70%, about 75%, about 80%, about 85%, about 90% or about 95% above the original degree of the particular effect. Alternatively, a "substantial" amount may refer to an amount greater than about 10%, about 15%, about 20%, about 25%, about 30%, about 35%, about 40%, about 45%, about 50%, about 55%, about 60%, about 65%, about 70%, about 75%, about 80%, about 85%, about 90% or about 95% of the initial or total amount. Similarly, "substantially reduced" as used herein refers to a reduction of an effect of about 10%, about 15%, about 20%, about 25%, about 30%, about 35%, about 40%, about 45%, about 50%, about 55%, about 60%, about 65%, about 70%, about 75%, about 80%, about 85%, about 90% or about 95% above the original degree of the particular effect.

As used herein the term "substantially free" as in "substantially free of matrix effects" refers to the reduction or elimination of matrix effects as a result of a particular workflow reagent such that the matrix effect observed is less than 20% of the effect as compared to the use of a workflow reagent not encapsulated in accordance with the invention. In certain embodiments, "substantially free" refers to less than 10%, less than 5%, less than 2% less than 1%, less than 0.5% or less than 0.1% of the effect as compared to the use of a workflow reagent not encapsulated in accordance with the invention. In certain other embodiments, "substantially free" refers to less than 1.0%, less than 0.7%, less than 0.5%, less than 0.4% less than 0.3%, less than 0.2% or less than 0.1% as compared to the use of a workflow reagent not encapsulated in accordance with the invention. In still other embodiments, "substantially free" refers to less than 1.0%, less than 0.7%, less than 0.5%, less than 0.4% less than 0.3%, less than 0.2% or less than 0.1% as compared to the use of a workflow reagent not encapsulated in accordance with the invention.

Workflow Reagents

In one aspect, the invention comprises encapsulated reagents for use in analytical workflows and sample preparation. In general, reagents are chosen by the skilled artisan to provide a desired result in the analytical workflow. The choice of any particular reagent is within the skill of the art.

Figure 2:
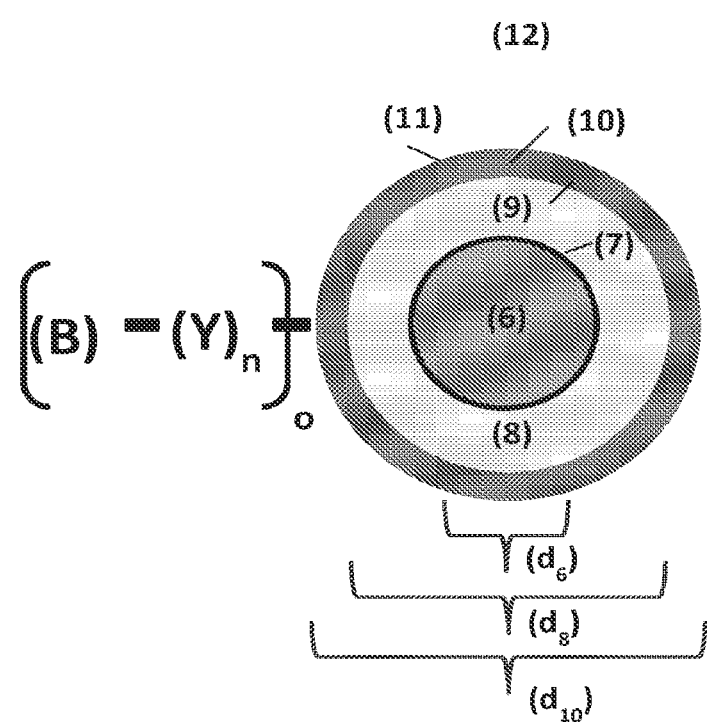
FIG. 2 is a cross sectional depiction of an encapsulated workflow material (12) of the invention having an internal encapsulation shell encapsulated within a primary encapsulation shell; in which B is a scaffolding material, Y is a linker group attached to the external surface of the primary encapsulation shell, (6) represents the cavity of the inner encapsulation shell in which a second workflow reagent is encapsulated; (7) represents the inner encapsulation shell; (8) represents the internal cavity of the primary encapsulation shell in which a first workflow reagent and the inner encapsulation shell is encapsulated; (9) represents the internal surface of the primary encapsulation shell; (10) represents the primary encapsulation shell; (11) represents the external surface of the primary encapsulation shell; (d6) is the internal diameter of the inner encapsulation shell; (d8) is the internal diameter of the primary encapsulation shell; (d10) is the external diameter of the primary encapsulation shell.
Figure 3:
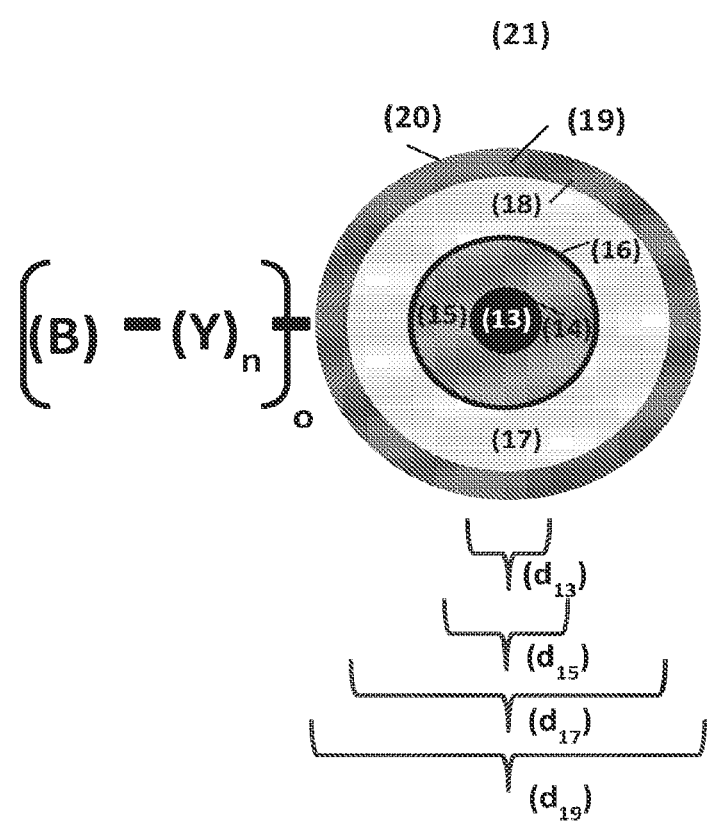
FIG. 3 is a cross sectional depiction of an encapsulated workflow material (21) of the invention having an two concentric encapsulation shells (inner and intermediate) encapsulated within a primary encapsulation shell; in which B is a scaffolding material, Y is a linker group attached to the external surface of the primary encapsulation shell, (13) represents the cavity of the inner encapsulation shell in which a second workflow reagent is encapsulated; (14) represents the inner encapsulation shell; (15) represents the internal cavity of the intermediate encapsulation shell in which a second workflow reagent and the inner encapsulation shell is encapsulated; (16) represents the intermediate encapsulation shell; (17) represents the internal cavity of the primary encapsulation shell in which a third workflow reagent and the intermediate encapsulation shell is encapsulated; (18) represents the internal surface of the primary encapsulation shell; (19) represents the primary encapsulation shell; (20) represents the external surface of the primary encapsulation shell; (d13) is the internal diameter of the inner encapsulation shell; (d15) is the internal diameter of the intermediate encapsulation shell; (d17) is the internal diameter of the primary encapsulation shell; (d19) is the external diameter of the primary encapsulation shell.
Figure 4:
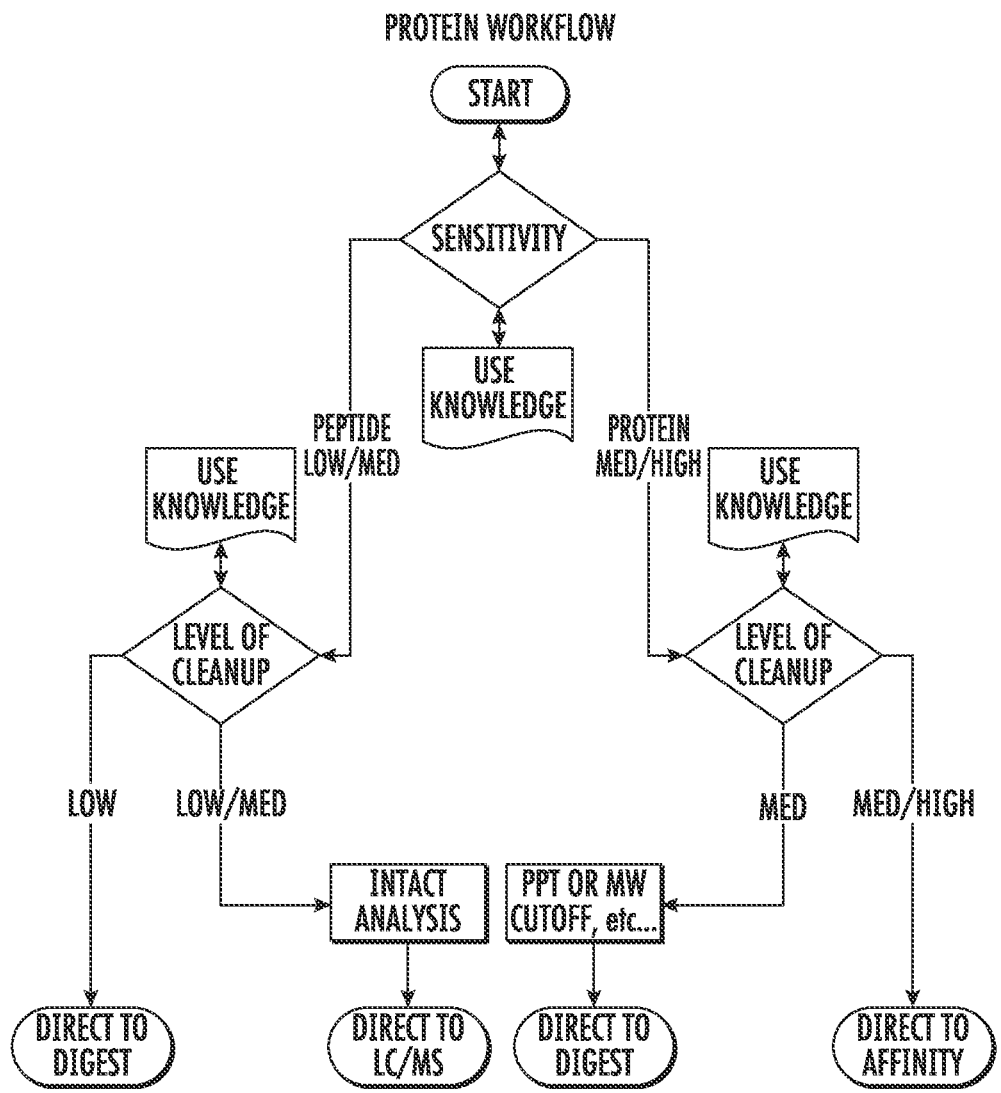
FIG. 4 is a flowchart depicting an exemplary workflow process for analysis of proteins.
Figure 5:
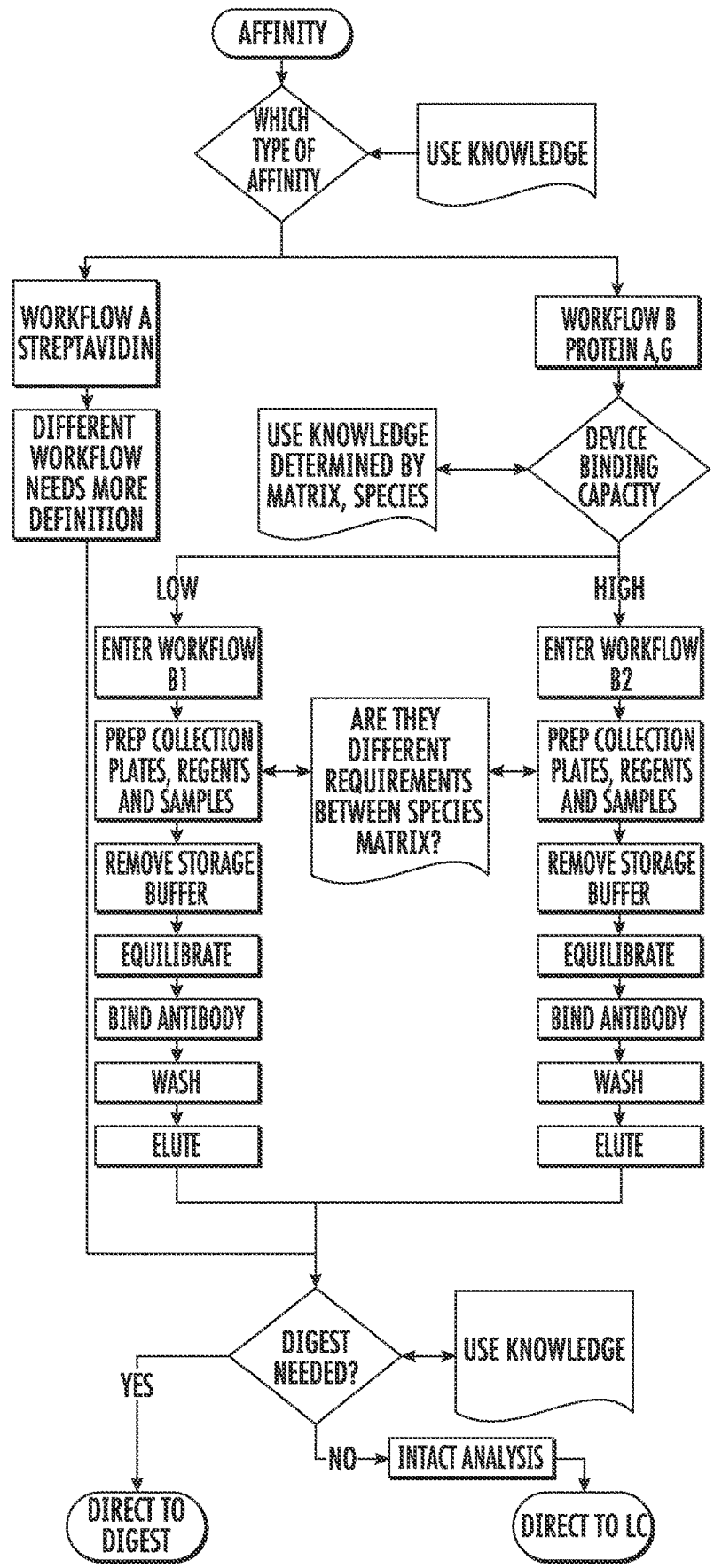
FIG. 5 is a flowchart depicting an exemplary workflow process for affinity chromatography.
Figure 6:
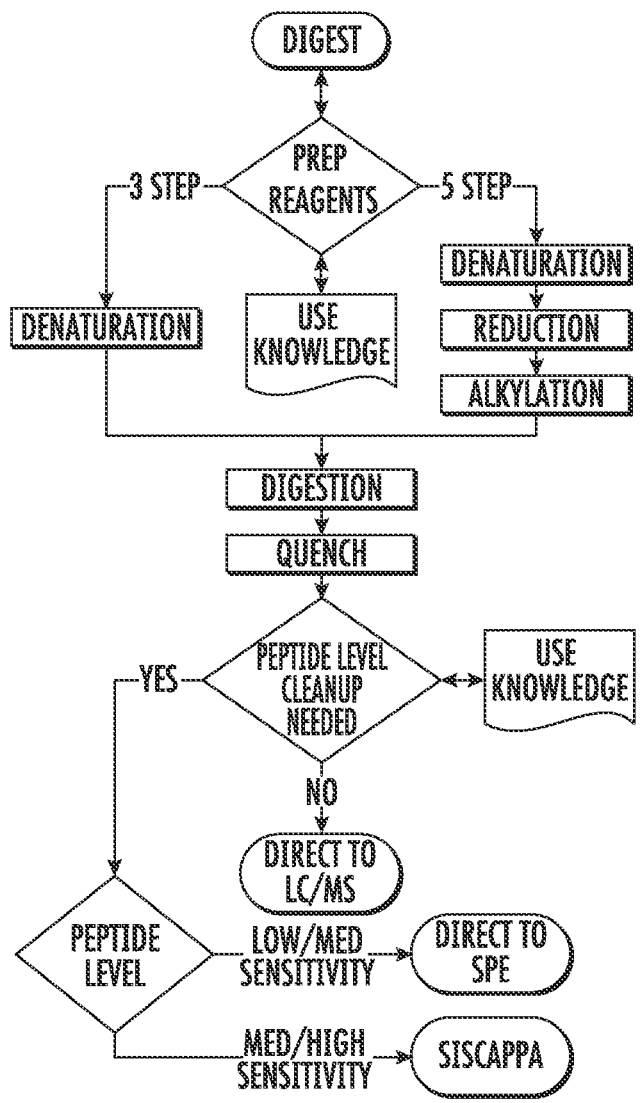
FIG. 6 is a flowchart depicting an exemplary workflow process for sample digestion.
Figure 7:
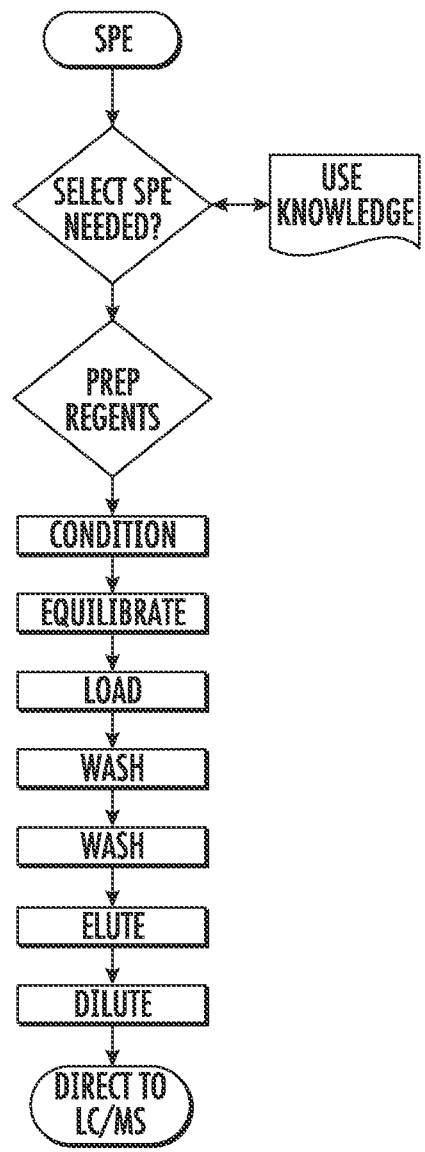
FIG. 7 is a flowchart depicting an exemplary workflow process for solid phase extraction (SPE) chromatography.
Figure 8:
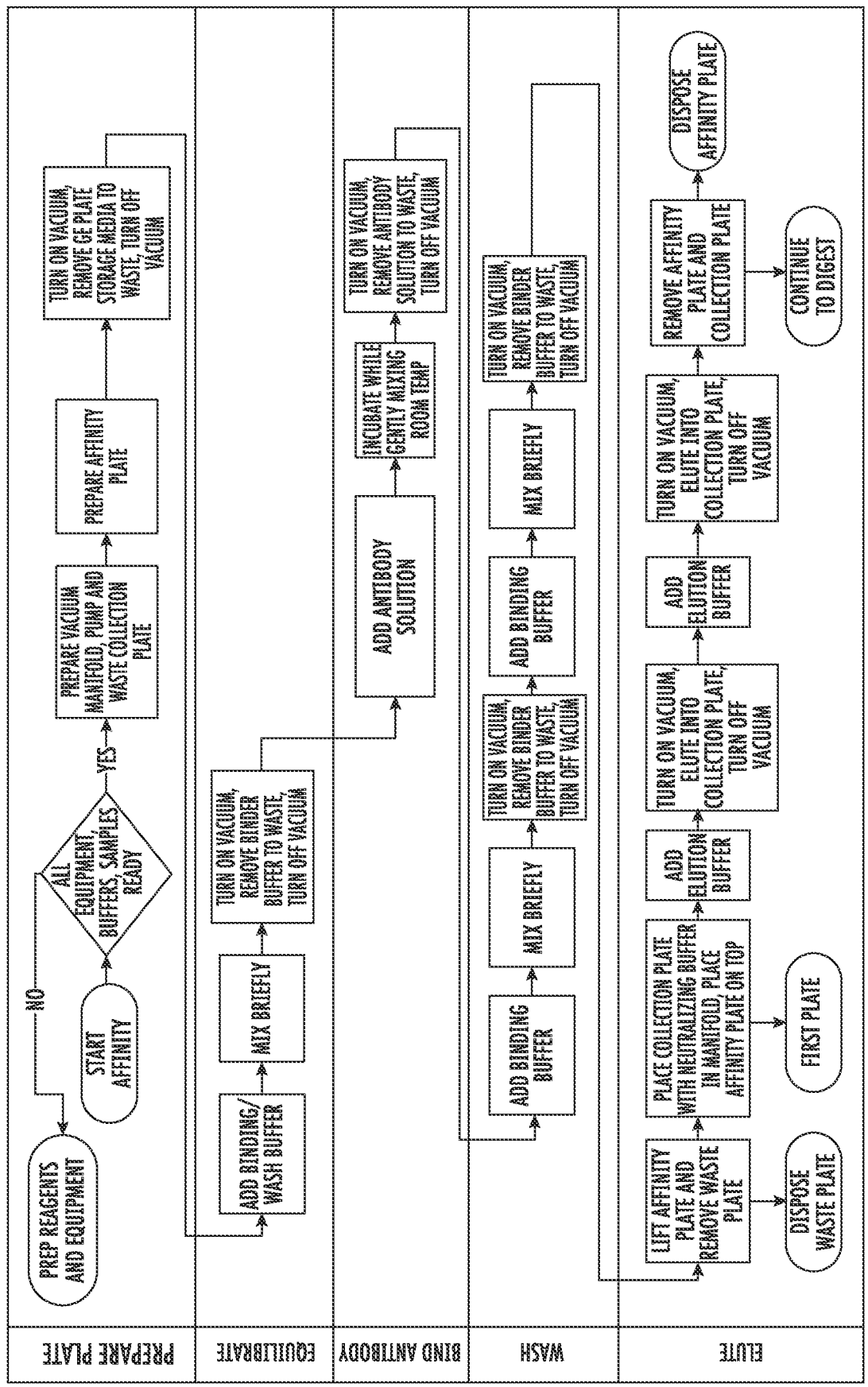
FIG. 8 is a flowchart depicting an exemplary workflow process for affinity antibody purification.
Figure 9:
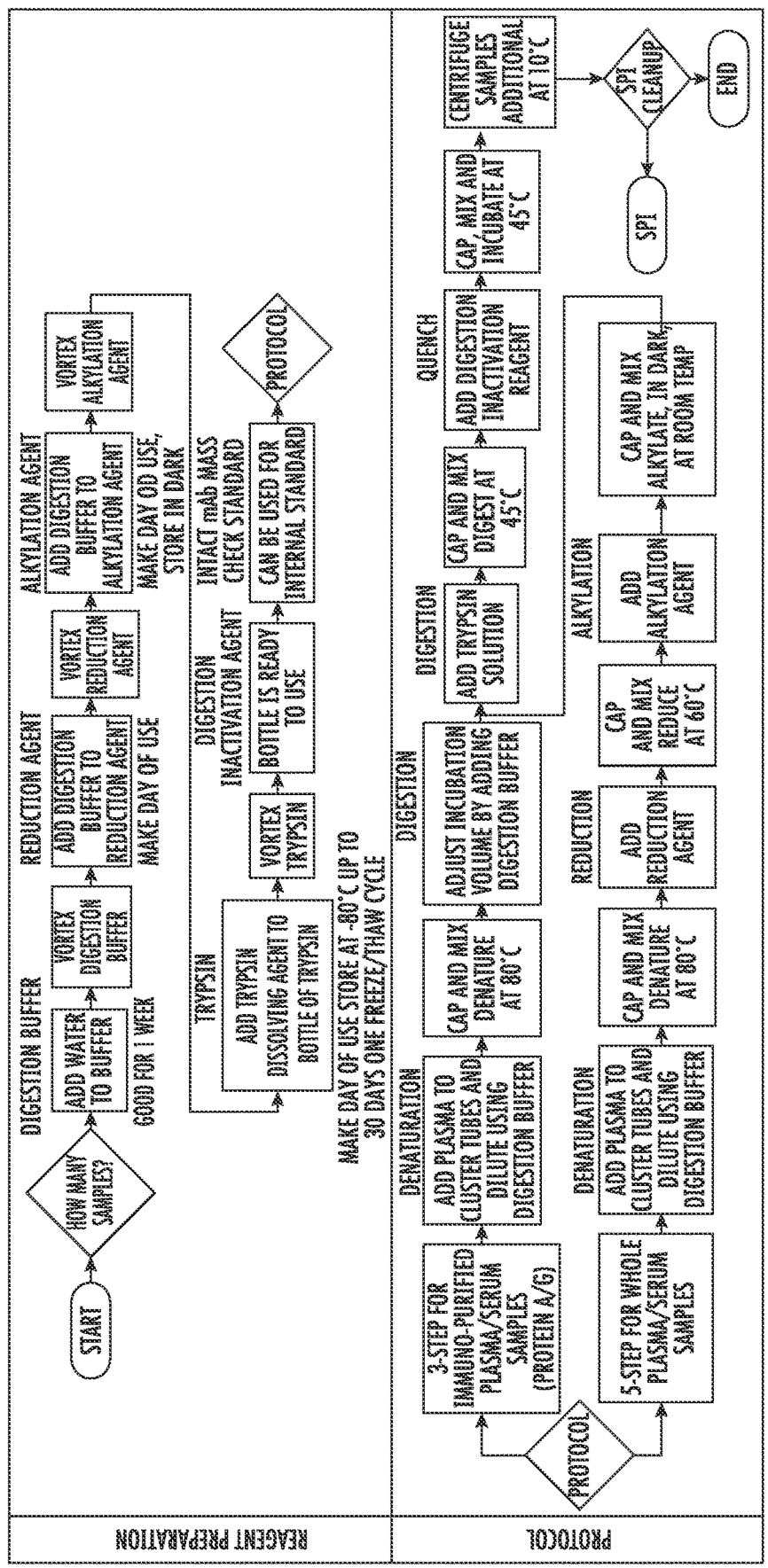
FIG. 9 is a flowchart depicting an exemplary workflow process for protein digestion.
Figure 10:
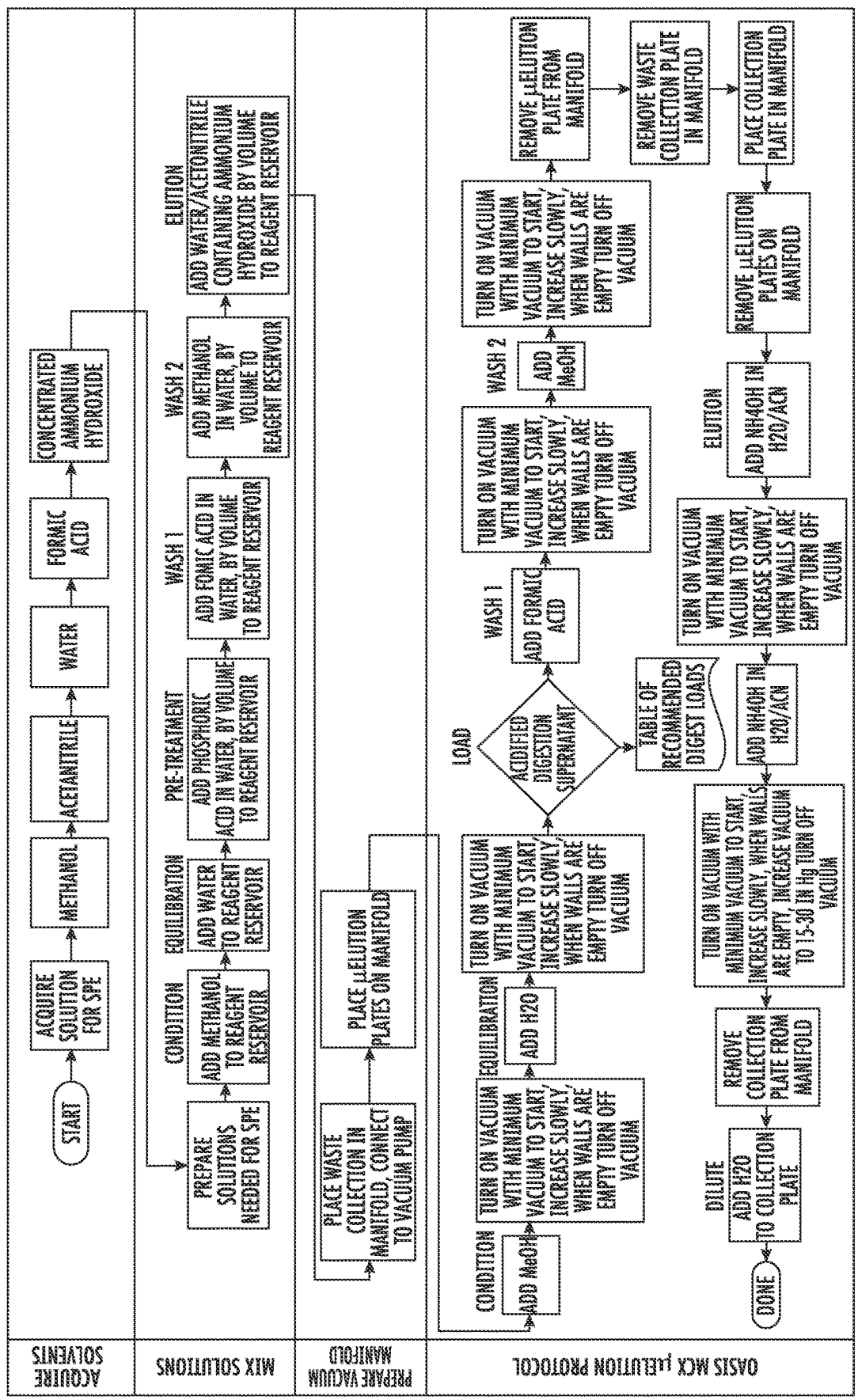
FIG. 10 is a flowchart depicting an exemplary workflow process for solid phase extraction.
Figure 11A:
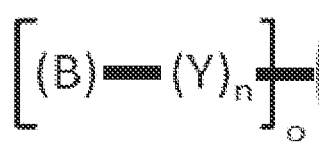
FIG. 11A is a cross sectional depiction of an encapsulated workflow material of the invention in which B is a scaffolding material, Y is a linker group attached to the external surface of the encapsulation material, and (1) represents the encapsulating material in which a workflow reagent is distributed throughout.
Figure 11A:
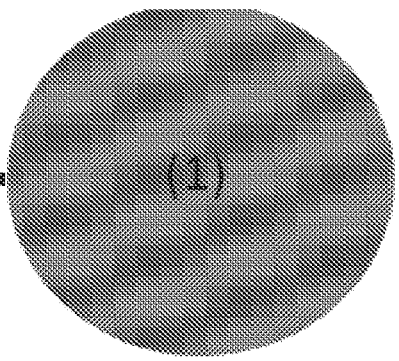
Figure 11B:
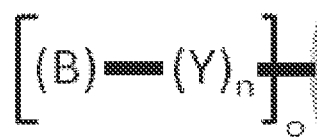
FIG. 11B is a cross sectional depiction of an encapsulated workflow material of the invention as in FIG. 11A but with a second encapsulating material layer (2) encapsulating a second workflow reagent coated onto the surface of the first encapsulating material (1). The second workflow reagent is distributed throughout the second encapsulating material (2).
Figure 11B:
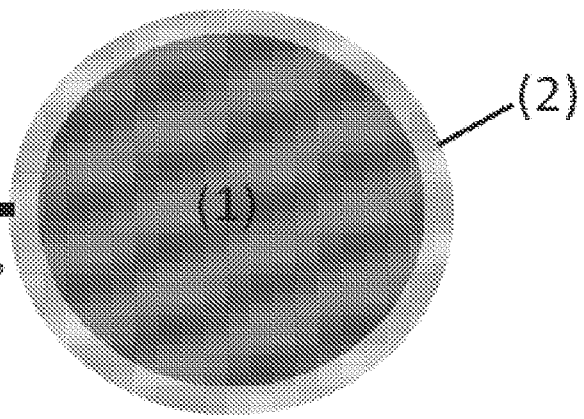

In certain embodiments, the encapsulated reagent may be an enzyme, a surfactant, a labeling reagent, a reactive compound, or an internal or external standard. In certain embodiments, the encapsulated reagent may be a combination of one or more reagents. In certain other embodiments, the encapsulated reagents may be a combination of one or more types of reagent. In certain embodiments in which more than one reagent is used, each reagent may be of the same or different types and the reagents may be contained within the same encapsulation as a mixture or within separate encapsulation materials. For example, in FIG. 2, an external standard may be encapsulated within an innermost encapsulation material designed to be released at the end of the workflow processing while an enzyme for digestion may be encapsulated within the outer encapsulation material designed to be released at the beginning of the workflow processing.

In certain embodiments, the enzyme for analytical workflow is a protease, cellulase, lipase, amylase, glucoamylase, glucose isomerase, xylanase, phytase, arabinanase, polygalacturonase, hydrolase, chymosin, urease, pectinase, beta-gluconase, ligase, glycosidase, polymerase, phosphatase, kinase, exopeptidase, endopeptidase, aminopeptidase, eramidase or a catalytic protease, such as a serine-protease, threonine protease, cysteine protease, aspartic protease, glutamic protease or other metallo proteases. In certain embodiments, the enzyme is trypsin, PNGase F, PNGase A, pepsin, chymotrypsin, peptidase, bromelain, papain, IdeS, or IdeZ, elastase, carboxypeptidase A, capthepsin D, capthepsin E or mixtures thereof. In certain embodiments the enzyme can be in solution or immobilized on a surface of a scaffolding material or an internal or external surface of an encapsulation shell.

In certain embodiments, the surfactant for analytical workflow is a cationic surfactant, a anionic surfactant, a nonionic surfactant, an amphoteric surfactant, a destructible surfactant, or a hydrotrope.

In certain embodiments, the surfactant is selected from the group consisting of carboxylates, sulphonates, petroleum sulphonates, alkylbenzenesulphonates, naphthalenesulphonates, olefin sulphonates, alkyl sulphates, sulphates, sulphated natural oils and fats, sulphated esters, sulphated alkanolamides, and alkylphenols.

In certain embodiments, the surfactant is selected from the group consisting of ethoxylated aliphatic alcohol, polyoxyethylene surfactants, carboxylic esters, polyethylene glycol esters, anhydrosorbitol ester, glycol esters of fatty acids, carboxylic amides, monoalkanolamine condensates, and polyoxyethylene fatty acid amides.

In certain embodiments, the surfactant is selected from the group consisting of quaternary ammonium salts, amines with amide linkages, polyoxyethylene alkyl amines, polyoxyethylene alicyclic amines, 4.n,n,n',n' tetrakis substituted ethylenediamines, 2-alkyl 1-hydroxyethyl 2-imidazolines.

In certain embodiments, the surfactant is Lauryl pyridinium, Lauryldimethylbenzyl ammonium, Octylphenoxyethoxyethyl-dimethylbenzyl ammonium, Cetyltrimethylammonium, Cetylpyridinium, Diethyl heptadecyl imidazolinium-1, Diethyl heptadecyl imidazolinium-2, 2M2HT quat-1, 2M2HT quat-2, 2M2HT quat-3, SDS-PAGE, Polysorbates (TWEEN™), Sodium dodecyl sulfate (sodium lauryl sulfate), Lauryl dimethyl amine oxide, Cetyltrimethylammonium bromide (CTAB), Polyethoxylated alcohols, Polyoxyethylene sorbitan, Octoxynol (TRITON X100™), N, N-dimethyldodecylamine-N-oxide, Hexadecyltrimethylammonium bromide (HTAB), Polyoxyl 10 lauryl ether, BRIJ 721™, Bile salts (sodium deoxycholate, sodium cholate), Polyoxyl castor oil (CREMOPHOR™), Nonylphenol ethoxylate (TERGITOL™), Cyclodextrins, Lecithin, Methylbenzethonium chloride (HYAMINE™), N-coco 3-aminopropionic acid/sodium salt, n-tallow 3-iminodipropionate, disodium salt, N-carboxymethyl n dimethyl n-9 octadecenyl ammonium hydroxide, n-cocoamidethyl n hydroxyethylglycine, sodium salt, 4-Bromophenacyl Bromide, 9-Chloromethylanthracene, N-Chloromethyl-4-nitrophthalimide, N-Chloromethylphthalimide, 3'-Methoxyphenacyl Bromide, O-(4-Nitrobenzyl)-N,N'-diisopropylisourea, 1-(4-Nitrobenzyl)-3-p-tolyltriazene, Phenacyl Bromide, 3,5-Dinitrobenzoyl Chloride, 2,4-Dinitrofluorobenzene, Nα-(5-Fluoro-2,4-dinitrophenyl)-L-leucinamide, Nα-(5-Fluoro-2,4-dinitrophenyl)-D-leucinamide, Phenyl Isothiocyanate, N-Succinimidyl 4-Nitrophenylacetate, 2,3,4,6-Tetra-O-acetyl-β-D-glucopyranosyl Isothiocyanate, 2,3,4,6-Tetra-O-benzoyl-β-D-glucopyranosyl Isothiocyanate, 3,5-Dinitrobenzoyl Chloride, 2,4-Dinitrophenylhydrazine Hydrochloride, O-4-Nitrobenzylhydroxylamine Hydrochloride, AABD-SH, Br-Mmc, 4-Bromomethyl-6,7-dimethoxycoumarin, 3-Bromomethyl-7-methoxy-1,4-benzoxazin-2-one, 9-Chloromethylanthracene, (R)-(−)-DBD-APy, (S)-(+)-DBD-APy, DBD-ED, DBD-PZ, (R)-(−)-NBD-APy, (S)-(+)-NBD-APy, NBD-CO-Hz, NBD-PZ, DBD-COCl, DBD-F, DBD-NCS, (R)-(+)-DBD-Pro-COCl, (S)-(−)-DBD-Pro-COCl, (R)-(−)-DBD-Py-NCS, (S)-(+)-DBD-Py-NCS, 4-(4,5-Diphenyl-1H-imidazol-2-yl)benzoyl Chloride Hydrochloride, NBD-Cl, NBD-, (R)-(+)-NBD-Pro-COCl, (S)-(−)-NBD-Pro-COCl, (R)-(−)-NBD-Py-NCS, (S)-(+)-NBD-Py-NCS, 1,3-Cyclohexanedione, Dansyl Hydrazine, DBD-H, or NBD-H. In certain embodiments the surfactant may be an acid labile surfactant or a destructible surfactant. Examples of such destructible surfactants include WATERS TECHNOLOGES COPRPORATION RAPIGEST™ and those which can be found, without limitation, in U.S. Pat. Nos. 8,580,533; 7,074,936; and 7,229,539; as well as US Patent Publication Nos. US 2006/0057659; US 2006/0094000; and International Patent Publication No. WO 2003/102225, the disclosures of each of which are incorporated herein by reference.

In certain embodiments, the labeling reagent for analytical workflow is a MS labeling reagent, a fluorescent labeling reagent, a hapten labeling reagent, a photoreactive labeling reagent, a radioisotope labeling reagent, an ultraviolet labeling reagent, a glycan labeling reagent, a covalent isotope-encoding labeling reagent, an amine-modifying labeling reagent, or a functional group-reactive reagent, including, but not limited to, an amine-reactive reagent. Examples of such labeling reagents can be found, without limitation, in US Patent Publication Nos. US 2014/0179011; US2014/0242709; US2016/0139136; in YING QING YU ET AL.: "A Rapid Sample Preparation Method for Mass Spectrometric Characterization of N-linked Glycans", RAPID COMM. MASS SPECTROMETRY, vol. 19, 2005, pages 2331, XP055031335, DOI: doi:10.1002/rcm.2067 and in European Patent Publication No. EP 533200 A1, the disclosures of each of which are incorporated herein by reference.

In certain embodiments, the internal or external standard for analytical workflow is a protein standard, a peptide standard, a deuterated standard, a radioisotope standard, a fluorescent standard, an ultraviolet standard, a glycan standard, a hapten standard, a stable isotope standard capture with anti-peptide antibodies (SISCAPA) standard, or mixtures thereof. Exemplary standards used in quantifying a target analyte in a sample using LC/MS, can be found in U.S. Pat. Nos. 9,274,124; 9,261,506; 9,170,263; 9,163,276; 9,018,580; 8,916,680; 8,633,031; 8,580,491; 8,574,860; 8,569,071; 8,568,988; 8,455,202; 8,187,893; 8,119,356; 8,097,425; 7,955,810; and 7,807,172, the disclosures of each of which are incorporated herein by reference. Exemplary standards for other workflows can be found in U.S. Pat. No. 8,105,790 or United States Patent Publication No. US 2014/0158881, the disclosures of each of which are incorporated herein by reference.

In certain embodiments, the reactive compound is a reduction agent or an alkylating agent. Particular reactive compounds include, but are not limited to, dithiothreitol (DTT), iodoacetamide, 2-mercaptoehtanol, 2-mercaptoethylamine HCl, Tris (2-carboxyethyl) phosphine hydrochloride, 4-vinylpyridine, haloacyl reagents including acetylchloride, N-ethylmaleimide, bromoalkanes, acrylamide, sodium borohydride, sodiumcyanoborohydride and other similar reducing agents such as metal hydrides.

In certain embodiments, the workflow reagent is an agent useful for amino acid analysis.

In certain embodiments, the workflow reagent is useful for analysis and identification of polar molecules. In particular embodiments, the workflow reagent is useful for analysis of polar pesticides. Examples of such polar compounds and reagents useful for their analysis and identification can be found in Journal of Chromatography and Separation Techniques, Volume 8, Issue, Pages 1000346/1-1000346/6, 2017.

In certain embodiments, workflow reagent may be a reagent having a strong odor. In such embodiments the reagent may bear a sulfur atom. In such embodiments, the encapsulation material is capable of reducing, masking or eliminating the odor of the reagent prior to or during the workflow.

In certain embodiments, workflow reagent may be a toxic or hazardous reagent. In such embodiments, the encapsulation material is capable of reducing or eliminating the exposure of the skilled artisan performing the workflow to the toxic or hazardous reagent.

The amounts of each workflow reagent incorporated in any particular separations device is not particularly limited and is readily determined prior to any given workflow by one of ordinary skill in the art.

Scaffolding Materials

The invention encompasses encapsulated workflow reagents. In certain embodiments, the encapsulated materials are attached to a secondary surface or a scaffolding material such as a particle, monolith, membrane, poly-HIPE, mesh, fiber, screen, anodized filters, scaffold, or frit-like material.

In certain embodiments, the scaffolding material of the invention includes, but is not limited to solid, porous solid, non-porous solid, macroporous solid, mesoporous solid, microporous solid, nanoporous solid, superficially porous solid, perfusive solid, controlled pore solid, amorphous solid, radially aligned porous solid, non-radially aligned porous solid, circular ordered porous solid, crystalline solid, amorphous solid, sintered solid, liquid, hydrogel, aerogel, xerogel, cryo-gels, soft-gel, frozen, wax-like, or gel-like material. As these materials may be varied in morphology. As such these scaffolding materials prevent loss or leakage of encapsulating material from the separation device and greatly reduce matrix effects, suppression or enhancement effects due to the encapsulating material in subsequent LC/MS analysis.

Exemplary scaffolding materials include, but are not limited to: wall-anchored monoliths (U.S. Pat. No. 9,289,747 and references contained therein), and wall-anchored polymeric high internal phase materials (Silverstein, M. S. and Cameron, N. R. 2010. PolyHIPEs—Porous Polymers from High Internal Phase Emulsions, Encyclopedia of Polymer Science and Technology; Iacono, M., Connolly, D. and Heise, A. *Materials* 2016, 9, 263; WO 2015/200735; and WO 2015/042592). The internal surface of the separation device can include, but are not limited to: steel, stainless steel, titanium, MP35n, PEEK, glass, polymer, polypropylene, polyethylene, copolymers, and polytetrafluoroethylene (TEFLON™).

In certain embodiments, the internal surface of the separation device can be modified before covalent attachment of the scaffolding material by a number of methods that include, but are not limited to: cleaning, washing with solvents, exposure to bases, exposure to acids, plasma pre-treatment, surface oxidation with plasma, surface treatment with fluoride sources, surface treatment with ozone, surface treatment with nitrogen exposure plasma assisted chemical vapor deposition, oxygen exposure plasma assisted chemical vapor deposition, air exposure plasma assisted chemical vapor deposition, chemical vapor deposition, molecular vapor deposition, liquid-phase coating approaches, dip-coating, electrochemical coating, initiated polymerization chemical vapor deposition, laser surface texturing, remote plasma sputtering. When chemical vapor deposition is employed the surface can be modified by a number of materials, including but not limited to layers of one or more of the following: metals (gold, titanium, silver, iron, nickel, copper, molybdenum, chromium) or oxides thereof; silanes or siloxanes, silica, or polymers. Preferred silanes result in surfaces containing silica, organo-silica, or hybrid organic/inorganic materials. Preferred surfaces result from compositions detailed in U.S. Pat. Nos. 9,248,383; 9,211,524; 9,145,481; 9,120,083; 8,791,220; 8,778,453; 8,697,765; 8,658,277; 7,919,177; 7,223,473; 6,686,035; and from compositions detailed in US 20150212056; 20150136700; 20150133294; 20140329919; 20140284259; 20140162298; 20140096596; 20130319086; 20130206665; 20130135610; 20130112605; 20120055860 and 20100076103, all of which are included herein in their entirety.

The encapsulating material and scaffolding material can display a variety of different groups that are capable of reacting using standard synthetic protocols to create a covalent linkage. There are a number of standard coupling methods known in the literature, including but not limited to March (Advanced Organic Chemistry, 3rd Edition, Wiley, New York, 1985); Odian (The Principles of Polymerization, 2nd Edition, Wiley, New York, 1981); and Bioconjugate Techniques (Hermanson, G. T., Bioconjugate Techniques; Academic Press: San Diego, 1996)-Repeat.). The resulting product comprises an encapsulated material attached to at least one secondary surface. The linker group between the encapsulating material and the scaffolding material surface is defined in formula I below.

In particular embodiments of the encapsulated workflow reagent of the invention, the encapsulated workflow reagent material has the formula

[(B)-(Y)$_n$)]$_o$-EM  (Formula I)

EM represents the encapsulating material;
B represents the scaffolding material;
Y is a linker group between the encapsulating material and the surface of the scaffolding material;
o is an integer greater than or equal to 0; and
n is an integer greater than or equal to 1. In certain embodiments, n is 1, 2, 3, 4, or 5. In certain embodiments, o is greater than or equal to 1. In other embodiments, o is 1. Such embodiments are depicted, for example, in FIG. 1.

In some embodiments having a linker group, the linker group is of the formula represented by Formula II

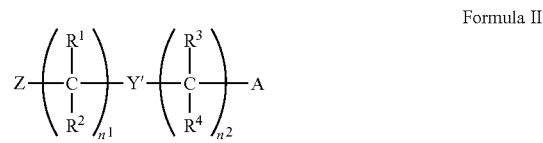

Formula II wherein
$n^1$ an integer from 0-30;
$n^2$ an integer from 0-30;
each occurrence of $R^1$, $R^2$, $R^3$ and $R^4$ independently represents hydrogen, fluoro, methyl, ethyl, n-butyl, t-butyl, i-propyl, lower alkyl, a protected or deprotected alcohol, a zwiterion, or a group Z;
Z represents:
a) a surface attachment group having Formula III:

(B$^1$)$_x$(R$^5$)$_y$(R$^6$)$_z$Si—  Formula III wherein x is an integer from 1-3,
y is an integer from 0-2,
z is an integer from 0-2,
and x+y+z=3
each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwiterion group;
$B^1$ represents —OR$^7$, —NR$^R$R$^{7"}$, —OSO$_2$CF$_3$, or —Cl; where each of $R^7$, $R^{7'}$ and $R^{7"}$ represents hydrogen, methyl, ethyl, n-butyl, iso-butyl, tert-butyl, iso-propyl, thexyl, phenyl, branched alkyl or lower alkyl;

b) an attachment to a surface group through a direct carbon-carbon bond formation or through a heteroatom, ester, ether, thioether, amine, amide, imide, urea, carbonate, carbamate, heterocycle, triazole, or urethane linkage; or
c) an adsorbed, surface group that is not covalently attached to the surface of the material;

Y' represents a direct bond; a heteroatom linkage; an ester linkage; an ether linkage; a thioether linkage; an amine linkage; an amide linkage; an imide linkage; a urea linkage; a thiourea linkage; a carbonate linkage; a carbamate linkage; a heterocycle linkage; a triazole linkage; a urethane linkage; a diol linkage; a polyol linkage; an oligomer of styrene, ethylene glycol, or propylene glycol; a polymer of styrene, ethylene glycol, or propylene glycol; a carbohydrate group, a multi-antennary carbohydrates, a dendrimer or dendrigraphs, or a zwitterion group; and A represents attachment to the encapsulating material by a ionic group, non-covalently attachment group or by a direct bond including (but not limited to): a heteroatom linkage; an ester linkage; an ether linkage; an thioether linkage; an amine linkage; an amide linkage; an imide linkage; a urea linkage; a thiourea linkage; a carbonate linkage; a carbamate linkage; a heterocycle linkage; a triazole linkage; a urethane linkage; a diol linkage; a polyol linkage; an oligomer of styrene, ethylene glycol, or propylene glycol; a polymer of styrene, ethylene glycol, or propylene glycol; a carbohydrate group, a multi-antennary carbohydrates, a dendrimer or dendrigraphs, or a zwitterion group.

The scaffolding materials of the invention are capable of forming a packed bed.

In certain embodiments in which the scaffolding materials are particles, the scaffolding materials have an average particle size of the material is between 0.8-3.0 μm. Specifically, the average particle size of the material may be between 1.1-2.9 μm or between 1.3-2.7 μm.

In certain embodiments in which the scaffolding materials are porous, the pores which have an average diameter of about 25-600 Å; about 60-350 Å; about 80-300 Å; or about 90-150 Å. In other embodiments in which the scaffolding materials are porous, the scaffolding materials have an average pore volume of about 0.11-0.50 $cm^3/g$; about 0.09-0.45 $cm^3/g$; or about 0.17-0.30 $cm^3/g$. In still other embodiments in which the scaffolding materials are porous, the scaffolding materials have a pore surface area between about 10 $m^2/g$ and 400 $m^2/g$.

In some embodiments in which the scaffolding materials are particles, the scaffolding materials of the invention have an average particle size of about 0.3-100 μm; about 0.5-20 μm; 0.8-10 μm; or about 1.0-3.5 μm.

Chromatographic Materials

In certain embodiments, workflow reagents can be bound to a chromatographic material. In such embodiments, the entire workflow reagent including the chromatographic material may then be encapsulated by the encapsulating material. Thus, in certain embodiments, the encapsulated workflow reagent encapsulated within the encapsulating material is attached to the surface of a chromatographic material.

In such embodiments, the chromatographic material is a solid, a porous solid, a non-porous solid, a macroporous solid, a mesoporous solid, a microporous solid, a nanoporous solid, a superficially porous solid, a perfusive solid, a controlled pore solid, an amorphous solid, a radially aligned porous solid, a non-radially aligned porous solid, a circular ordered porous solid, a crystalline solid, a sintered solid, a hydrogel, an aerogel, a xerogel, a cryo-gel, a soft-gel, a gel-like material, a water-wettable material, a particle material, or a monolith material.

In other embodiments, the chromatographic materials including (but not limited to): polymer materials, silica materials, hybrid organic/inorganic materials, ion-exchange materials, metal impregnated materials, activated carbon, silica, Fluorosil, reversed-phase material, hydrophilic interaction material, hydrophobic interaction materials, desalting materials, restricted access material, or size exclusion material.

In certain embodiments, the chromatographic materials have chromatographically-enhancing pore geometry. In certain embodiments, the chromatographic materials are composite materials. In certain embodiments, the chromatographic materials comprise nanoparticles.

In other embodiments, the chromatographic materials have a surface area of about 25 to 1100 $m^2/g$; about 80 to 500 $m^2/g$; or about 120 to 330 $m^2/g$.

In still other embodiments, the chromatographic materials have a pore volume of about 0.15 to 1.5 $cm^2/g$; or about 0.5 to 1.3 $cm^2/g$.

In other embodiments, the chromatographic materials have a micropore surface area of less than about 110 $m^2/g$; less than about 105 $m^2/g$; less than about 80 $m^2/g$; or less than about 50 $m^2/g$.

In some embodiments, the chromatographic materials have an average pore diameter of about 20 to 1500 Å; about 50 to 1000 Å; about 100 to 750 Å; or about 110 to 500 Å.

In still embodiments, the chromatographic materials is in the form of particles and have an average particle size of about 0.3-100 μm; about 0.5-20 μm; 0.8-10 μm; or about 1.0-3.5 μm.

Encapsulation Materials

The concern with encapsulating materials is the release or bleed of additional matrix effects, polymers, oligomer or nanoparticles into the LC, MS, LC/MS/MS or LC/MS analysis. For example, insoluble or precipitated polymeric materials can result in fouling or clogging of an LC, MS, LC/MS/MS or LC/MS system. Such impurities could also co-elute with a desired target molecules in a chromatographic separation. More importantly the introduction of polymeric, liposomal, or ionizable materials from the encapsulating material can result in the enhancement or suppression of MS signal. This can impact the sensitivity, quantification, signal-to-noise-ratio, and identification in an MS analysis.

As such, one aspect of the invention provides for the use of encapsulating materials that do not release or bleed additional matrix effects, polymers or nanoparticles into a LC, MS, LC/MS/MS or LC/MS analysis. This invention allows for the use of encapsulated reagent with immobilized enzymes in a flow-through device. Additionally, the product of this invention allows for the design of a singular device for complex workflows that allows for a single sample addition (e.g., whole blood, plasma, serum, urine, tissue) into the device and a single product isolated from the device that is then used in a LC, LC/MS or MS analysis, in that the specific device is a flow through device that does not require the use of centrifugation.

Reducing or eliminating bleed or introduction of matrix effects into the LC, MS, LC/MS/MS or LC/MS analysis can be achieved by a number of methods of the present invention. As such, in certain embodiments, the encapsulation materials do not bleed into an LC, MS, LC/MS/MS or LC/MS analysis. In other embodiments, the encapsulation materials do not ionize under MS analysis. In certain embodiments, the encapsulation materials are not soluble under conditions used for LC, MS, LC/MS/MS or LC/MS analysis. In certain embodiments, the encapsulation materials are crosslinked. In certain embodiments, the encapsulation materials are attached to the internal wall of the sample preparation or fluidic device.

The encapsulating materials may be made with one or more polymers to provide a controlled release of the workflow reagents.

In certain embodiments, encapsulating material may be prepared following the method of Caruso (Phys. Chem. Chem. Phys., 2011, 13, 4782); Sukhishvili (Chem. Mater., 2006, 18 (2), 328); US20150164805; EP2213280; or Schwendeman (J Control Release. 2014; 196:60). Materials used to prepare encapsulating material include (but are not limited to): emulsifiers, materials with varied melting points, materials with different hydrophilic/lipophilic balances (HLB), phospholipids, fatty acids, plant sterols, sorbitan esters, bees wax, carnauba wax, paraffin, stearates, shellac, cellulose derivatives, maltodextrin, starch, gums, cellulose, Polypyrrole, polycarbonate, cetyltrimethylammonium halides, silanes, diblock copolymers, triblock copolymers such as poly(ethylene oxide)-blockpoly(propylene oxide)-block-poly(ethylene oxide), named P123 (PEO20PPO70PEO20) and F127 (PEO106PPO70-PEO106), alginate, chitosan, xanthan gum, polysaccharide, polysaccharide hydrogel, poly(lysine), poly(acrylic acid), agarose, PEG, poly(hydroxyethylmetacrylate-methyl methacrylate), poly(acrylic acid-co-acrylamide), poly(allylaminehydrochloride), poly(styrenesulfonate sodium salt), poly-(diallyldimethylammonium chloride), poly(ethylene imine), N-hydroxysuccinimide-PEG, maleimide-PEG-conjugated phospholipids, paraffin, cyclodextrin, carboxymethylated polysaccharide, polycaprolactone, humic substances, Span 60, cholesterol, N-trimethyl chitosan chloride, poly(methyl methacrylate), poly(2-hydroxyethyl methacrylate), poly(N-isopropylacrylamide), poly(N-isopropylmethacrylamide), poly(N-n-propylacrylamide), carboxymethylcellulose, plastic, gold, molecular weight cut-off filters, hybrid organic/inorganic materials, metal oxides, plastics, silica including SBA-15 (PD 50-89 Å) and MCM-41, ceramics, clays, smectic clays, and niosomes.

In certain embodiments, the encapsulating material contain, or are subsequently modified to display, a functional group that is capable of subsequently reacting with the reactive groups of the co-polymeric particle, using standard synthetic reactions. For example, in certain embodiments, the encapsulating material contains an amino-alkyl functional group, an ester functional group, an amide functional group, or a carbamate function group which may be reacted with, for example, a chloromethyl group of the co-polymeric particle, There are a number of standard coupling methods known in the literature, including but not limited to March (Advanced Organic Chemistry, 3rd Edition, Wiley, New York, 1985); Odian (The Principles of Polymerization, 2nd Edition, Wiley, New York, 1981); and Bioconjugate Techniques (Hermanson, G. T., Bioconjugate Techniques; Academic Press: San Diego, 1996).

In particular embodiments, encapsulating materials containing peripheral amino-alkyl functional groups are then reacted with the scaffolding material to form a covalent attachment between the encapsulating material and the co-polymeric particle, using standard synthetic reactions. In certain such embodiments, the linker group between the encapsulating material and the scaffolding material surface can result from the nucleophilic displacement of chlorine to form an alkyl-amino-methyl linker (e.g., {(encapsulating material)-alkyl-NHCH$_2$}$_n$ (co-polymeric particle) where n is ≥1).

Polymeric Materials

Suitable thermoplastic polymers for incorporation as the encapsulation material include, but are not limited to polylactides, polyglycolides, polycaprolactones, polyanhydrides, polyamides, polyurethanes, polyesteramides, polyorthoesters, polydioxanones, polyacetals, polyketals, polycarbonates, polyorthocarbonates, polyphosphazenes, polyhydroxybutyrates, polyhydroxyvalerates, polyalkylene oxalates, polyalkylene succinates, poly(malic acid) polymers, polymaleic anhydrides, poly(methylvinyl) ethers, poly(amino acids), chitin, chitosan, and copolymers, terpolymers, or combinations or mixtures of the above materials.

Examples of biodegradable polymers and oligomers suitable for use in the compositions and methods of the present invention include, but are not limited to: poly(lactide)s; poly(glycolide)s; poly(lactide-co-glycolide)s; poly(lactic acid)s; poly(glycolic acid)s; and poly(lactic acid-co-glycolic acid)s; poly(caprolactone)s; poly(malic acid)s; polyamides; polyanhydrides; polyamino acids; polyorthoesters; polyetheresters; polycyanoacrylates; polyphosphazines; polyphosphoesters; polyesteramides; polydioxanones; polyacetals; polyketals; polycarbonates; polyorthocarbonates; degradable polyurethanes; polyhydroxybutyrates; polyhydroxyvalerates; polyalkylene oxalates; polyalkylene succinates; chitins; chitosans; oxidized celluloses; and copolymers, terpolymers, blends, combinations or mixtures of any of the above materials.

As used herein, "hydrophobic" refers to a polymer that is substantially not soluble in water. As used herein, "hydrophilic" refers to a polymer that may be water-soluble or to a polymer having affinity for absorbing water, but typically not when covalently linked to the hydrophobic component as a co-polymer, and which attracts water into the device.

The term "log P" as used herein, refers to the octanol: water partition coefficient. The formula for the partition coefficient is Log P=[analyte concentration in octanol]/[analyte concentration in water]. The log P value is used as a measure of an analytes hydrophobicity or hydrophobicity where values of less than 1 indicate that the analyte concentration if higher in water than in octanol. As such the analyte would be considered a more hydrophilic or polar analyte. Log P values greater than 1 indicate that an analyte is more hydrophobic or non-polar. The higher the log P value correlates with a higher hydrophobicity relative to lower values on the same scale. The lower the log P value relative to 1 indicates that the analyte is more hydrophilic or more polar than others of higher value.

Hydrophilic polymers suitable for use herein can be obtained from various commercial, natural or synthetic sources well known in the art. Suitable hydrophilic polymers include, but are not limited to: polyanions including anionic polysaccharides such as alginate; agarose; heparin; polyacrylic acid salts; polymethacrylic acid salts; ethylene maleic anhydride copolymer (half ester); carboxymethyl amylose; carboxymethyl cellulose; carboxymethyl dextran; carboxymethyl starch; carboxymethyl chitin/chitosan; carboxy cellulose; 2,3-dicarboxycellulose; tricarboxycellulose; carboxy gum arabic; carboxy carrageenan; carboxy pectin; carboxy tragacanth gum; carboxy xanthan gum; carboxy guar gum; carboxy starch; pentosan polysulfate; curdlan; inositol hexasulfate; beta.-cyclodextrin sulfate; hyaluronic acid; chondroitin-6-sulfate; dermatan sulfate; dextran sulfate; heparin sulfate; carrageenan; polygalacturonate; polyphosphate; polyaldehydo-carbonic acid; poly-1-hydroxy-1- sulfonate-propen-2; copolystyrene maleic acid; mesoglycan; sulfopropylated polyvinyl alcohols; cellulose sulfate; protamine sulfate; phospho guar gum; polyglutamic acid; polyaspartic acid; polyamino acids; and any derivatives or combinations thereof. One skilled in the art will appreciate other hydrophilic polymers that are also within the scope of the present invention.

Various water-soluble polymers suitable for use herein include, but are not limited to: poly (alkyleneglycol), polyethylene glycol ("PEG"); propylene glycol; ethylene glycol/propylene glycol copolymers; carboxylmethylcellulose; dextran; polyvinyl alcohol ("PVOH"); polyvinyl pyrolidone; poly (alkyleneamine)s; poly (alkyleneoxide)s; poly-1,3-dioxolane; poly-1,3,6-trioxane; ethylene/maleic anhydride copolymers; polyaminoacids; poly (n-vinyl pyrolidone); polypropylene oxide/ethylene oxide copolymers; polyoxyethylated polyols; polyvinyl alcohol succinate; glycerine; ethylene oxides; propylene oxides; poloxamers; alkoxylated copolymers; water soluble polyanions; and any derivatives or combinations thereof. In addition, the water-soluble polymer may be of any suitable molecular weight, and may be branched or unbranched.

In the practice of the invention, the hydrophobic polymer component is co-polymerized with a hydrophilic polymer, or monomers, to yield a polymer system, most preferably a block copolymer, or blended with a hydrophilic polymer to yield a blended polymer system. These resultant polymer systems are characterized as having a small amount of hydrophilic character, but they will not form a hydrogel following immersion in an aqueous system. For example, preferred polymer systems for use in the compositions of the present invention may contain a water-soluble polymer such as polyethylene glycol (PEG) in amounts typically up to 25 to 30 wt %, not imparting the hydrogel properties cited by Churchill but producing devices that exhibit monophasic or zero-order or near zero-order release kinetics. If a PEG is used in the system, the preferred molecular weight may be between about 700 Da and about 500 kDa. Other particularly preferred hydrophilic polymers for use in the polymer systems of the invention include polyvinyl pyrolidone, polyvinyl alcohols, poly (alkyleneamine)s and poly (alkyleneoxide)s.

As used herein, "polymer" and "polymer system" include copolymers and blends unless otherwise expressly defined. The polymer systems can be produced using standard copolymerization techniques, such as graft copolymerization, polycondensation and polyaddition, optionally with an appropriate catalyst. These techniques can be carried out in conventional manner well known in the polymer art as regards to time and temperature. Alternatively, the polymer systems can be produced using standard blending techniques of polymers or blending of copolymers, again carried out in conventional manner well known in the polymer art as regards to time and temperature.

Depending on the desired softness and flexibility of the encapsulation material, the rate and extent of reagent release, rate of degradation, and the like, the amount and type of polymer can be varied to produce the desired result. For example, for a relatively soft and flexible polymer system, copolymers with a low $T_g$ can be used, primarily the lactide/caprolactone copolymers. The ratio of glycolide to lactide or to caprolactone can also be varied to effect water diffusibility, which increases with an increasing amount of the more hydrophilic monomer. The hydrophilic character of these monomers increases in the series as caprolactone<lactide<glycolide.

Encapsulation Shells and Impregnated Layers

In certain embodiments, the polymers form an encapsulation shell which may be rendered porous under certain conditions and over time, thereby controlling the release. The pores can be formed by a swelling of the polymer shell or by a dissolution or degradation of the shell. In certain embodiments, the encapsulation materials comprise one or more reagents. In certain other embodiments, the encapsulations materials comprise one or more reagents and one or more additional encapsulation materials within the shell thereby forming a series of shells which release the reagent at different times. In such instances, the materials can take the form of a series of concentric encapsulation shells which allow for the sequential release of reagents. In such instances, it is preferred that the encapsulation shell/sphere is incapable of passing through the pores of the shell in which it is encapsulated but that the reagent encapsulated therein is released after a desired time. In other such instances, the materials can be formed in microcapsules contained within the primary/outermost encapsulation shell. In such instances, different microcapsules may release their reagent at the same time thereby allowing reagents which must remain separate until reaction to do so. In such instances, it is preferred that encapsulated microcapsules remain within the primary/outermost encapsulation shell without passing through the pores therein.

In certain embodiments having one or more additional encapsulation shells such that one or more encapsulation shells—inner shells—are encapsulated within another encapsulation shell—outer shell, each encapsulation shell has an inner surface and outer surface such that the outer surface of one or more inner encapsulation shells is bound to the inner surface of an outer encapsulation shell. In particular embodiments having one or more additional encapsulation shells, all of the encapsulation shells are bound such that the shells remain tethered together upon release of the various workflow reagents and, if present, the scaffolding material.

The mass, volume and thickness of the polymers in each encapsulation shell/sphere can also be varied to adjust the release rate of the incorporated reagent.

The use of the term shell/sphere, as used herein, is not limiting as to the shape of the encapsulation material. Although the shape of the material is generally spherical, it is possible to prepare and utilize conical shells, tubular shells, oblong shells, cylindrical rods, and the like. In certain embodiments the material may be amorphous or irregularly shaped. In certain other embodiments the encapsulation material may be coated or bonded to the surface of a scaffolding material or a chromatographic material. In such embodiments, the encapsulation material may take the shape of the material to which it is bonded. In certain embodiments in which the chromatographic material or scaffolding material is porous, the encapsulation may or may not penetrate the pores of the underlying material.

Figure 12:
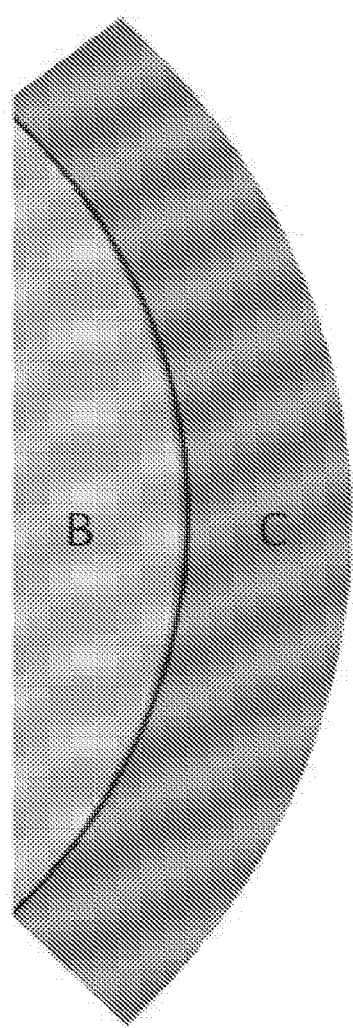
FIG. 12 is a cross sectional depiction of an encapsulated workflow material of the invention in which B is a scaffolding material which may or may not have a workflow reagent covalently attached or adsorbed thereto and C is an encapsulating material layer coated and, optionally, bonded to the surface of B. Although C may contain a workflow reagent encapsulated therein and evenly distributed throughout, when B contains a workflow reagent covalently attached or adsorbed thereto, C may not contain a workflow reagent or may optionally include an additional workflow reagent.
Figure 13:
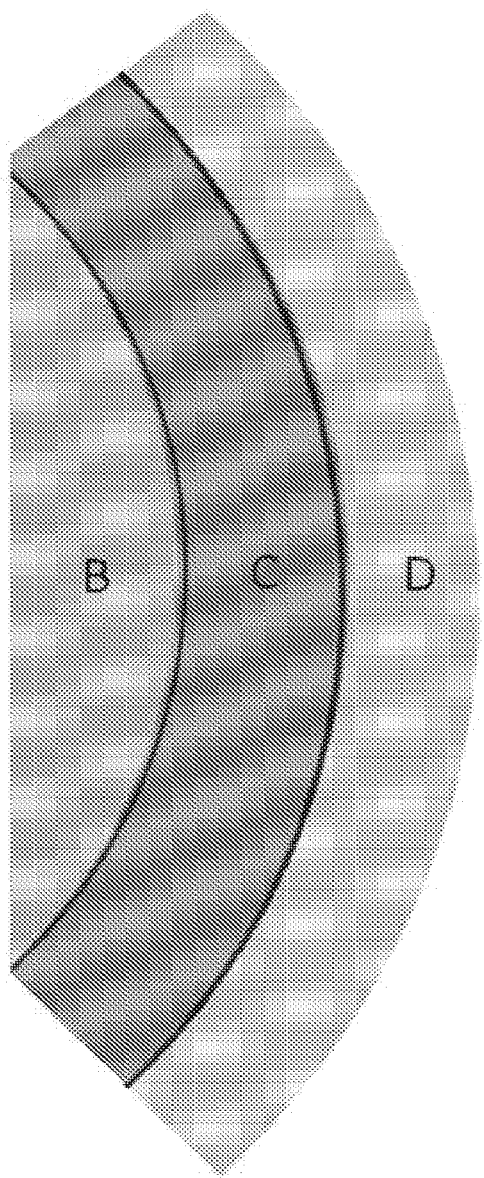
FIG. 13 is a cross sectional depiction of an encapsulated workflow material of the invention in which B is a scaffolding material which may or may not have a workflow reagent covalently attached or adsorbed thereto, C is an encapsulating material layer and D is a second encapsulating material layer. Each encapsulating material layer has an inner and outer surface which may be covalently bonded to the layer or material adjacent to the inner or outer surface of each layer. Layers C and D may contain one or more workflow reagents encapsulated therein and evenly distributed throughout. In certain embodiments, when B contains a workflow reagent covalently attached or adsorbed thereto, C or D may independently not contain a workflow reagent or may optionally include an additional workflow reagent. In certain embodiments, when C contains a workflow reagent encapsulated therein, D may not contain a workflow reagent or may optionally include an additional workflow reagent.

In certain other embodiments, the polymers may be impregnated with the workflow reagent and coated onto the surface of a scaffolding material. In such embodiments, the workflow material is blended or mixed with the polymers such that the reagent becomes embedded, encapsulated or impregnated into the polymer matrix. In such embodiments, the encapsulation material does not form a discreet encapsulation shell but, instead, the encapsulation material containing the workflow reagent may be coated onto a scaffolding material as a layer and, optionally, covalently or ionically bonded thereto. In certain embodiments in which more than one workflow reagent is used, the different workflow reagents are impregnated into the same encapsulation material layer. In other embodiments, in which more than one workflow reagent is used, the different workflow reagents are impregnated into different encapsulation material layers which are coated sequentially such that the innermost layer—the layer coating the scaffolding material—is released last while the outermost layer—the layer having no subsequent layer coated or bonded thereto—is released first. Such embodiments are depicted, for example, in FIGS. 11-13.

In certain embodiments, the encapsulation material may be a wax, hydrogel, a silicone rubber, or a trehalose glass. The use of hydrogels, silicone rubbers and trehalose glasses is particularly suited for the impregnation of workflow reagents into the polymer material though any suitable polymer may be used in such embodiments.

In still other embodiments, the workflow reagent can be loaded into the pores of a porous material, for example, a porous scaffolding material or a porous chromatographic material. In such embodiments, once the workflow reagent is loaded into the pores of the porous material, the porous material can be coated with one or more polymeric encapsulation materials as described herein. In such embodiments, the polymeric encapsulation material may further include one or more additional workflow reagents which are impregnated into the encapsulation material as discussed above.

Inducing Release

The encapsulated workflow reagents may be released from the encapsulating materials by any number of means as may be known to one of ordinary skill in the art. In certain embodiments of the invention, such release can be induced by contacting the encapsulating material with a pore-forming agent. In other embodiments of the invention, the release can be induced by a physical change or a chemical change. For example, and without limitation, the release can be induced by changes in temperature, pH, ionic charge, counterion charge, or counterion atom. Similarly, the release can be induced by contacting the encapsulating material with a solvent including, but not limited to, an organic solvent, an aqueous solvent, an aliphatic solvent, an aromatic solvent, an oxygenated solvent, or a halogenated solvent, or water. Depending on the particular workflow and encapsulating materials, the release may be induced by a combination of means for release.

In general, the release rate for a reagent will be determined by the skilled artisan based on the particular workflow being utilized. In certain embodiments, the desired release rate is immediate whereas in other embodiments the release rate is controlled so that the reagent is released over a period of time. In certain embodiments, the reagent is released over the course of the workflow such that about 100% of the reagent is released by the time that about 100% of the sample has been introduced. In other embodiments, the reagent is released over the course of the workflow such that about 100% of the reagent is released by the time that about 90% of the sample has been introduced; by the time that about 80% of the sample has been introduced; by the time that about 75% of the sample has been introduced; by the time that about 50% of the sample has been introduced; or by the time that about 25% of the sample has been introduced. In other embodiments, when multiple reagents are encapsulated, the release of each reagent is optimized for the particular workflow being performed.

Pore-Forming Agents

Other additives can be used to advantage in further controlling the desired release rate of a reagent for a particular workflow protocol. For example, if the thermoplastic polymer liquid composition is too impervious to water, a pore-forming agent can be added to generate additional pores in the matrix. Any compatible water-soluble material can be used as the pore-forming agent. These agents can be either soluble in the liquid composition or simply dispersed within it. They are capable of dissolving, diffusing or dispersing out of both the coagulating polymer matrix and the formed polymer system whereupon pores and microporous channels are generated in the matrix and system. The amount of pore-forming agent (and size of dispersed particles of such pore-forming agent, if appropriate) within the composition will directly affect the size and number of the pores in the polymer system.

Other factors can also influence the size and/or diameter of the pores formed in the polymer system. For example, the amount of organic solvent, and the rate at which the polymer system solidifies, can all affect the porosity of the polymer system. Although a generally microporous matrix without a resolved core and skin can be produced according to the invention, typically, without an additional pore-forming agent a polymer system formed from the liquid composition is composed of a surface skin and inner core. The surface skin is typically less porous, and even relatively nonporous, when compared to the inner core. The inner core can contain pores with a diameter of about 10-1000 µm. With additional pore-forming agent, the pore sizes of the core and skin become substantially uniform such that they both have pores in the range of 10 to 1000 µm.

The concentration of pore-forming agent relative to thermoplastic polymer in the composition will vary according to the degree of pore-formation desired. Generally, this concentration will range from about 0.01 to 1 gram of pore-forming agent per gram of polymer. If the agent is soluble in the liquid composition, then the mixing or distribution of the agent in the liquid composition and the aggregation when the thermoplastic coagulates will determine the size of the resultant pores as the agent dissolves out of the polymer matrix.

Pore-forming agents include any pharmaceutically acceptable organic or inorganic substance that is substantially miscible in water and body fluids and will dissipate from the forming and formed matrix into aqueous medium or body fluids or water-immiscible substances that rapidly degrade to water-soluble substances. The pore-forming agent may be soluble or insoluble in the polymer liquid composition of the invention. In the liquid composition of the invention, it is further preferred that the pore-forming agent is miscible or dispersible in the organic solvent to form a uniform mixture. Suitable pore-forming agents include, for example, sugars such as sucrose and dextrose, salts such as sodium chloride and sodium carbonate, and polymers such as hydroxylpropylcellulose, carboxymethylcellulose, polyethylene glycol, and polyvinylpyrrolidone. The size and extent of the pores can be varied over a wide range by changing the molecular weight and percentage of pore-forming agent incorporated into the polymer system.

Other excipient materials can be added to the devices to alter porosity, for example, materials like sucrose, dextrose, sodium chloride, sorbitol, lactose, polyethylene glycol, mannitol, fructose, polyvinyl pyrrolidone or appropriate combinations thereof. Additionally, the active agents may be dispersed with oils (e.g., sesame oil, corn oil, vegetable), or a mixture thereof with a phospholipid (e.g., lecitin), or medium chain fatty acid triglycerides (e.g., caprylic/capric triglycerides (MIGLYOL® 812) to provide an oily suspension.

Devices and Methods

Another aspect provides a variety of separations and analytic devices having a stationary phase comprising the materials as described herein. The separations devices include, e.g., chromatographic columns, thin layer plates, filtration membranes, sample cleanup devices and microtiter plates; packings for HPLC columns; solid phase extraction (SPE); ion-exchange chromatography; magnetic bead applications; affinity chromatographic and SPE sorbents; sequestering reagents; solid supports for combinatorial chemistry; solid supports for oligosaccharide, polypeptides, and/or oligonucleotide synthesis; solid supported biological assays; capillary biological assay devices for mass spectrometry, templates for controlled large pore polymer films; capillary chromatography; electrokinetic pump packing materials; packing materials for microfluidic devices; polymer additives; catalysis supports; and packings materials for microchip separation devices. Similarly, materials of the invention can be packed into preparatory, microbore, capillary, and microfluidic devices.

In certain embodiments, the encapsulated materials of the invention are used in a separation device, a sample preparation device, or a fluidic device. As such, one aspect of the invention encompasses a separation device, a sample preparation device, or a fluidic device comprising an encapsulated material of the invention.

In certain embodiments, the encapsulation materials are prevented from permeation or bleeding from the separation device by the use of molecular weight cut-off filters, ultra-filtration, membranes, or frits.

In specific embodiments, the sample preparation or a fluidic device allows for removal through adsorption of the undesired matrix effects introduced from the encapsulating materials and the elution of the desired target analytes or precursors from the flow-through device with or without active gating or valving.

In other embodiments, the sample preparation or a fluidic device allows for adsorption of desired target analytes or precursors on a chromatographic material, and the elution of undesired matrix effects introduced from the encapsulating materials by elution from the flow-through device with or without active gating or valving.

In other embodiments, the sample preparation or a fluidic device allows for a chromatographic separation of the desired target analytes or precursors from the undesired matrix effects introduced from the encapsulating materials, with or without the use of gating or valving in the flow through device. In this separation the desired target analytes or precursors elute before or after the undesired matrix effects.

In other embodiments, the devices comprise chromatographic materials including (but not limited to): polymer materials, silica materials, hybrid organic/inorganic materials, ion-exchange materials, metal impregnated materials, activated carbon, silica, Fluorosil, reversed-phase material, hydrophilic interaction material, hydrophobic interaction materials, desalting materials, restricted access material, or size exclusion material.

In certain embodiments, the sample preparation or a fluidic device includes the use of Enzyme immobilization (Chem. Soc. Rev., 2009, 38, 453-468).

In one embodiment, the device may further include a housing. The housing, as used herein, may have a chamber for accepting samples and the encapsulated material. The housing in the present invention may also be used for a chromatographic column or device without limitation.

In certain exemplary embodiments, the housing of the devices may be a single chamber or the housing has a plurality of chambers. In addition, the housing may also be constructed and arranged to present the chambers in a plate-like format as described in US Pub. No.: US 2013/0053588 A1 and U.S. Pat. No. 6,723,236, each of which is incorporated herein by reference in its entirety. In yet certain exemplary embodiments, the housing may be, but are not limited to, a syringe, a cartridge, a column, a multiple chamber, a 8-well rack, a 8-well strip, a 96-well plate, 96-well micro-elution plate, micro-elution tip, a 96-micro-elution tip array, an 8-tip micro-elution strip, a single micro-elution pipet tip, a spin tube or a spin container. However, any number of chambers or shape of the chambers may be obtained based upon a user's requirements.

In certain embodiments, a solution received in the housing may flow into the device spontaneously, for example, by capillary action. Alternatively, the flow may be generated through the device by external forces, such as gravity, a vacuum chamber, reservoir or a structure to allow for use in a centrifuge, or with a vacuum or pressure source, external pressure and the like, without limitation.

In certain exemplary embodiments, the housing may be configured to have at least one cap or lid for closing the housing after the sample is received. Also, the cap may provide a pressure source for efficient extraction process. In certain yet exemplary embodiments, the cap may be associated with a vacuum chamber, reservoir or a structure to allow for use in a centrifuge, or with a vacuum or pressure source to apply vacuum or suction to facilitate flow out of the solution or liquid throughout the device to the outlet. In particular, a vacuum chamber, reservoir or a structure to allow for use in a centrifuge or with a vacuum or pressure source may also be associated with other component of the housing without limitation, as known in the art. In particular embodiments, the housing may be configured to have a hydrophobic frit to allow for retention of aqueous solutions.

In certain exemplary embodiments, the housing may be formed of a substantially rigid material which withstands sufficient mechanical strength applied during the extraction. Exemplary materials may be, but not limited to, a glass, a metal, a plastic and the like. In an exemplary embodiment, the molded plastic such polyether ether ketone (PEEK), polycarbonate (PC), and the like may be used without limitation, as known in the art.

In certain exemplary embodiments, a capacity of the housing may be various according to the volume of the sorbents, samples and the like based on a user's requirements. Exemplary housings of the invention may have a capacity of about 1 mL, about 2 mL, about 3 mL, about 4 mL, about 5 mL, about 6 mL, about 7 mL, about 8 mL, about 9 mL, about 10 mL, about 15 mL, about 20 mL, about 30 mL, about 40 mL, about 50 mL, or about 100 mL, without limitation.

In one embodiment, the device may further include an inlet or an outlet.

In one embodiment, the device of the invention may include one or more of frits or filters. For instance, a frit or a filter may be disposed at the bottom of the sorbents or a frit or a filter may be disposed on the top of the sorbents. The frits or filters, as used herein, may maintain stabilization or equilibration the sorbents until sufficient flow is generated through the device. In other words, the frits or filters may prevent the sorbents from being penetrated by the sample solution until a sufficient external force is applied. In certain exemplary embodiments, a porous frit may be used. Exemplary frits may be, but not limited to, a hydrophobic frit material such as TEFLON™ which may be in a form of membrane, filter, screen or monolithic structure or combination thereof. In yet certain exemplary embodiments, frits may not be disposed in the sorbents. In other certain exemplary embodiments, frits may be disposed between layers of sorbents, without limitations to number or orders.

In certain aspects, the invention provides a method for preparing a sample for chromatographic analysis comprising the steps of:
  providing a sample preparation material comprising an encapsulated workflow reagent;
  introducing a sample to the sample preparation material; and
  allowing the sample to remain with the sample preparation material for sufficient time to release the encapsulated workflow reagent.

In certain embodiments, the release of the encapsulated workflow is induced by introduction of a pore forming agent or a solvent.

In certain other embodiments, the method further comprises the steps of separating the sample from the sample preparation material and analyzing the sample on a chromatographic device.

In certain embodiments, the encapsulation material and/or the workflow reagents are chosen so as to minimize matrix interference or signal suppression. The term "matrix interference" as used herein, refers to those components of the sample that produce a substantial signal enhancement or suppression with the analytes during analysis by mass spectrometry. A substantial signal enhancement or suppression that interferes with analyte quantitation is also termed a substantial interference. In certain embodiments, the "substantial interference" refers to a matrix effect that is greater than 20% for targeted analyses and 50% for screening analyses. Matrix interferences lower than these are considered acceptable if the majority of analytes in an analysis have matrix effect below this threshold.

One method for determining potential matrix effects utilizes post-column infusion of eluates derived using blank (unspiked) plasma. A clean standard (1), containing the analytes of interest, is injected on the column. A tee of the infused eluates combines with the fluid from the column outlet. The combined flow is then directed into the MS for analysis.

The MS detector analyzes each analyte, as it elutes from the column, in the presence of the blank plasma eluates from the various sample preparation methods to be compared. This method shows matrix effects differences attributed to matrix substances remaining in the eluate. The MS response for each of the analytes while infusing matrix-free elution solutions is compared to the MS response for each of the analytes while infusing eluates from processing blank plasma by the cited method. This approach to accessing matrix effects in known to those familiar with the art. Examples of a reference for this approach is C. Polson et al./J. Chromatogr. B 785 (2003) 263-275.

Further methods for avoiding matrix interference can be found, for example, in International Patent Application Serial No. PCT/US15/65993. International Patent Application Serial No. PCT/US15/65993 also provides exemplary chromatographic devices, columns, and packing materials which may be adapted to include the encapsulated workflow reagents of the invention. The disclosure of International Patent Application Serial No. PCT/US15/65993 is incorporated herein by reference.

EXAMPLES

Characterization

Those skilled in the art will recognize that equivalents of the following instruments and suppliers exist and, as such, the instruments listed below are not to be construed as limiting.

The % C values were measured by combustion analysis (CE-440 Elemental Analyzer; Exeter Analytical Inc., North Chelmsford, MA) or by Coulometric Carbon Analyzer (modules CM5300, CM5014, UIC Inc., Joliet, IL). The specific surface areas (SSA), specific pore volumes (SPV) and the average pore diameters (APD) of these materials were measured using the multi-point N2 sorption method (Micromeritics ASAP 2400; Micromeritics Instruments Inc., Norcross, GA). The SSA was calculated using the BET method, the SPV was the single point value determined for $P/P_0 > 0.98$ and the APD was calculated from the desorption leg of the isotherm using the BJH method. The micropore surface area (MSA) was determined as the cumulative adsorption pore diameter data for pores <34 Å subtracted from the specific surface area (SSA). The median mesopore diameter (MPD) and mesopore pore volume (MPV) were measured by mercury porosimetry (Micromeritics AutoPore IV, Micromeritics, Norcross, GA). Skeletal densities were measured using a Micromeritics AccuPyc 1330 Helium Pycnometer (V2.04N, Norcross, GA). Scanning electron microscopic (SEM) image analyses were performed (JEOL JSM-5600 instrument, Tokyo, Japan) at 7 kV. High resolution SEM image analyses were performed using a Focused Ion Beam (FIB/SEM) instrument (Helios 600 Nanolab, FEI Company, Hillsboro, OR) at 20 kV. Particle sizes were measured using a Beckman Coulter Multisizer 3 analyzer (30-μm aperture, 70,000 counts; Miami, FL). The particle diameter (dp) was measured as the 50% cumulative diameter of the volume based particle size distribution. The width of the distribution was measured as the 90% cumulative volume diameter divided by the 10% cumulative volume diameter (denoted 90/10 ratio). Viscosity was determined for these materials using a Brookfield digital viscometer Model DV-II (Middleboro, MA). FT-IR spectra were obtained using a Bruker Optics Tensor 27 (Ettlingen, Germany). Multinuclear ($^{13}$C, $^{29}$Si) CP-MAS NMR spectra were obtained using a Bruker Instruments Avance-300 spectrometer (7 mm double broadband probe). The spinning speed was typically 5.0-6.5 kHz, recycle delay was 5 sec. and the cross-polarization contact time was 6 msec. Reported $^{13}$C and $^{29}$Si CP-MAS NMR spectral shifts were recorded relative to tetramethylsilane using the external standards adamantane ($^{13}$C CP-MAS NMR, d 38.55) and hexamethylcyclotrisiloxane ($^{29}$Si CP-MAS NMR, d −9.62). Populations of different silicon environments were evaluated by spectral deconvolution using DMFit software. [Massiot, D.; Fayon, F.; Capron, M.; King, I.; Le Calvé, S.; Alonso, B.; Durand, J.-O.; Bujoli, B.; Gan, Z.; Hoatson, G. Magn. Reson. Chem. 2002, 40, 70-76].

Example 1

Porous, co-polymeric spherical particles with an average particle size of 60 μm are prepared following the process detailed in U.S. Pat. Nos. 5,882,521; 5,976,367; 6,106,721; 6,254,780; 6,468,422; and 6,726,842 or U.S. Pat. No. 9,211,524; or 9,120,083 and are surface modified using the process detailed in U.S. Pat. Nos. 7,731,844; 8,197,692; or 8,791, 220. In particular the surface of the co-polymeric materials are functionalized to display a chloromethyl group on the aromatic substituent groups.

Separately, encapsulating material (<60 μm) are prepared following the method of Caruso (Phys. Chem. Chem. Phys., 2011, 13, 4782); Sukhishvili (Chem. Mater., 2006, 18 (2), 328); US20150164805; EP2213280; or Schwendeman (J Control Release. 2014; 196:60). Materials used to prepare encapsulating material include (but are not limited to): emulsifiers, materials with varied melting points, materials with different HLB, phospholipids, fatty acids, plant sterols, sorbitan esters, bees wax, carnauba wax, paraffin, stearates, shellac, cellulose derivatives, maltodextrin, starch, gums, cellulose, Polypyrrole, polycarbonate, cetyltrimethylammonium halides, silanes, diblock copolymers, triblock copolymers such as poly(ethylene oxide)-blockpoly(propylene oxide)-block-poly(ethylene oxide), named P123 (PEO20PPO70PEO20) and F127 (PEO106PPO70-PEO106), alginate, chitosan, xanthan gum, polysaccharide, polysaccharide hydrogel, poly(lysine), poly(acrylic acid), agarose, PEG, poly(hydroxyethylmetacrylate-methyl methacrylate), poly(acrylic acid-co-acrylamide), poly(allylaminehydrochloride), poly(styrenesulfonate sodium salt), poly-(diallyldimethylammonium chloride), poly(ethylene imine), N-hydroxysuccinimide-PEG, maleimide-PEG-conjugated phospholipids, paraffin, cyclodextrin, carboxymethylated polysaccharide, polycaprolactone, humic substances, Span 60, cholesterol, N-trimethyl chitosan chloride, poly(methyl methacrylate), poly(2-hydroxyethyl methacrylate), poly(N-isopropylacrylamide), poly(N-isopropylmethacrylamide), poly(N-n-propylacrylamide), carboxymethylcellulose, plastic, gold, molecular weight cut-off filters, hybrid organic/inorganic materials, metal oxides, plastics, silica including SBA-15 (PD 50-89 Å) and MCM-41, ceramics, clays, smectic clays, and niosomes.

The encapsulating material contain, or are subsequently modified to display an amino-alkyl functional group that is capable of subsequently reacting with the chloromethyl groups of the co-polymeric particle, using standard synthetic reactions. There are a number of standard coupling methods known in the literature, including but not limited to March (Advanced Organic Chemistry, 3rd Edition, Wiley, New York, 1985); Odian (The Principles of Polymerization, 2nd Edition, Wiley, New York, 1981); and Bioconjugate Techniques (Hermanson, G. T., Bioconjugate Techniques; Academic Press: San Diego, 1996)).

The encapsulating materials containing peripheral amino-alkyl functional groups are then reacted with the chloromethyl groups of the co-polymeric particle to form a covalent attachment between the encapsulating material and the co-polymeric particle, using standard synthetic reactions. The resulting product comprises a porous, co-polymeric particle with one or more encapsulating materials attached to the periphery. The linker group between the encapsulating material and the co-polymeric material surface results from the nucleophilic displacement of chlorine to form an alkyl-amino-methyl linker (e.g., {(encapsulating material)-alkyl-NHCH$_2$}$_n$(co-polymeric particle) where n is ≥1).

The target molecule is then loaded into the encapsulating material following methods detailed above. The target molecule includes, but is not limited to labeling reagents, standards, enzymes (e.g., trypsin, PNGase F, pepsin, IdeS, IdeZ), solution-phase modifiers, reducing agents, alkylating agents, and chloroformate esters. Solution-phase modifiers include, but are not limited to buffer salts, salts, pH-modifiers such as urea, uric acid, citrate, citric acid, HCl, acetic acid, and reagents that are further modified or decompose to change the solution phase environment (e.g., urea, carbonates, anhydrides, acetic anhydride).

The resulting target molecule containing encapsulating materials on a porous co-polymeric particle are packaged into a 1 cc sample prep device containing polymeric frits above and below the packing material. The frit porosity is selected to be significantly smaller than the product particle size, as to maintain the sorbent within the device.

The resulting device is used in a sample preparation workflow before analysis using liquid chromatography and mass spectrometry (LC/MS). The device is exposed to solvents and a sample. Since the product is larger than the frit porosity it is well maintained within the device. Since the encapsulating material is attached to the surface of the co-polymeric particle, there is no significant loss of free polymer from the device. The advantage of this is the outlet frit does not clog, and high permeability is maintained. Also as there is no measurable free polymer introduced into the LC/MS, there is no significant increase in matrix effects, enhancement or suppression of signal. Matrix effects, enhancement and suppression are well known in LC/MS.

Because the 60 μm co-polymeric particles prevent loss or leakage of encapsulating material from the separation device and greatly reduces matrix effects, suppression or enhancement effects due to the encapsulating material in subsequent LC/MS analysis, this co-polymeric particle is a scaffolding material.

During the workflow the target molecule is released, resulting in the desired change in workflow. This release of target molecule does not result in a significant increase in matrix effects, enhancement or suppression.

Example 2

The process of Example 1 is modified, having the target molecule be trypsin. The workflow consists of the release of trypsin in the presence of a protein, resulting in the digestion of the protein and formation of peptides. Resulting peptides then elute from the device and are further analyzed by LC/MS. Because the trypsin was maintained in the encapsulating material on the scaffolding material it displayed longer stability and good digestion performance. Because the encapsulating material is immobilized on the scaffolding material there is no significant increase in matrix effects, enhancement or suppression.

Example 3

The process of Example 2 is modified, having the target molecule be trypsin. The workflow consists of the release of trypsin in the presence of a protein, resulting in the digestion of the protein and formation of peptides. The formed peptides interact with the porous co-polymeric scaffolding material and do not elute from the device until the elution strength is suitable (e.g., modification of acetonitrile and water composition during an elution step). Resulting peptides then elute from the device and are further analyzed by LC/MS. Because the trypsin was maintained in the encapsulating material on the scaffolding material it displayed longer stability and good digestion performance. Because the encapsulating material is immobilized on the scaffolding material there is no significant increase in matrix effects, enhancement or suppression.

Example 4

The process of Example 1-3 is modified to replace the 60 μm co-polymeric particle with a co-polymeric particle preferably that has an average particle size in the range of 1-300 µm; more preferably having an average particle size in the range of 5-100 µm, more preferably having an average particle size in the range of 10-70 µm; more preferably having an average particle size in the range of 20-60 µm. The frit porosity is adjusted accordingly to ensure particles are maintained within the sample preparation device.

Example 5

The device detailed in Example 1-4 is modified to a microbore, high pressure column, commonly used in HPLC, UHPLC, or UPLC. Similar workflows are performed in a constant flow, semi-constant flow, static-pressure (no flow), low pressure (<1,000 psi system pressure) or high pressure format (1,000-20,000 system pressure).

Example 6

The scaffolding material of Example 1-5 is modified to include solid, porous solid, non-porous solid, macroporous solid, mesoporous solid, microporous solid, nanoporous solid, superficially porous solid, perfusive solid, controlled pore solid, amorphous solid, radially aligned porous solid, non-radially aligned porous solid, circular ordered porous solid, crystalline solid, amorphous solid, sintered solid, liquid, hydrogel, aerogel, xerogel, cryo-gels, soft-gel, frozen, wax-like, or gel-like material. These scaffolding materials prevent loss or leakage of encapsulating material from the separation device and greatly reduce matrix effects, suppression or enhancement effects due to the encapsulating material in subsequent LC/MS analysis.

Example 7

The scaffolding material in Examples 1-6 are modified to include materials that direct covalent attachment to the internal surface of the separation device. Exemplary scaffolding materials include, but are not limited to: wall-anchored monoliths (U.S. Pat. No. 9,289,747 and references contained therein), and wall-anchored polymeric high internal phase materials (Silverstein, M. S. and Cameron, N. R. 2010. PolyHIPEs—Porous Polymers from High Internal Phase Emulsions, Encyclopedia of Polymer Science and Technology; Iacono, M., Connolly, D. and Heise, A. *Materials* 2016, 9, 263; WO 2015/200735; and WO 2015/042592). The internal surface of the separation device can include, but are not limited to: steel, stainless steel, titanium, MP35n, PEEK, glass, polymer, polypropylene, polyethylene, copolymers, and TEFLON™.

The internal surface of the separation device can be modified before covalent attachment of the scaffolding material by a number of methods that include, but are not limited to: cleaning, washing with solvents, exposure to bases, exposure to acids, plasma pre-treatment, surface oxidation with plasma, surface treatment with fluoride sources, surface treatment with ozone, surface treatment with nitrogen exposure plasma assisted chemical vapor deposition, oxygen exposure plasma assisted chemical vapor deposition, air exposure plasma assisted chemical vapor deposition, chemical vapor deposition, molecular vapor deposition, liquid-phase coating approaches, dip-coating, electrochemical coating, initiated polymerization chemical vapor deposition, laser surface texturing, remote plasma sputtering. When chemical vapor deposition is employed the surface can be modified by a number of materials, including but not limited to layers of one or more of the following: metals (gold, titanium, silver, iron, nickel, copper, molybdenum, chromium) or oxides thereof; silanes or siloxanes, silica, or polymers. Preferred silanes result in surfaces containing silica, organo-silica, or hybrid organic/inorganic materials. Preferred surfaces result from compositions detailed in U.S. Pat. Nos. 9,248,383; 9,211,524; 9,145,481; 9,120,083; 8,791,220; 8,778,453; 8,697,765; 8,658,277; 7,919,177; 7,223,473; 6,686,035; and from compositions detailed in US 20150212056; 20150136700; 20150133294; 20140329919; 20140284259; 20140162298; 20140096596; 20130319086; 20130206665; 20130135610; 20130112605; 20120055860 and 20100076103, all of which are included herein in their entirety.

Example 8

The process of Example 1-7 is modified to include different types of linkages between the surface of the encapsulating material and the scaffolding material. The encapsulating material and scaffolding material can display a variety of different groups that are capable of reacting using standard synthetic protocols to create a covalent linkage. There are a number of standard coupling methods known in the literature, including but not limited to March (Advanced Organic Chemistry, 3rd Edition, Wiley, New York, 1985); Odian (The Principles of Polymerization, 2nd Edition, Wiley, New York, 1981); and Bioconjugate Techniques (Hermanson, G. T., Bioconjugate Techniques; Academic Press: San Diego, 1996)-Repeat.). The resulting product comprises a encapsulated material attached to at least one secondary surface. The linker group between the encapsulating material and the scaffolding material surface is defined in formula I

$[(B)-(Y)_n]_o$-EM  (Formula I)

EM represents the encapsulating material;
B represents the scaffolding material;
Y is a linker group between the encapsulating material and the surface of the scaffolding material;
o is an integer greater than or equal to 0; and
n is an integer greater than or equal to 1.

In particular, Y is a linker group between the encapsulating material and the co-polymeric material surface, and can be (but not limited to) the formula represented by Formula II

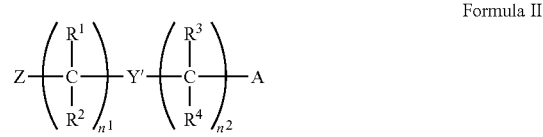

Formula II $$Z \left( \begin{array}{c} R^1 \\ | \\ C \\ | \\ R^2 \end{array} \right)_{n1} Y' \left( \begin{array}{c} R^3 \\ | \\ C \\ | \\ R^4 \end{array} \right)_{n2} A$$

wherein
$n^1$ an integer from 0-30;
$n^2$ an integer from 0-30;
each occurrence of $R^1$, $R^2$, $R^3$ and $R^4$ independently represents hydrogen, fluoro, methyl, ethyl, n-butyl, t-butyl, i-propyl, lower alkyl, a protected or deprotected alcohol, a zwiterion, or a group Z;
Z represents:
a) a surface attachment group having Formula III:

$(B^1)_x(R^5)_y(R^6)_z$Si—  Formula III wherein x is an integer from 1-3,
y is an integer from 0-2, z is an integer from 0-2,
and x+y+z=3
each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwiterion group;

$B^1$ represents $-OR^7$, $-NR^{7'}R^{7''}$, $-OSO_2CF_3$, or $-Cl$; where each of $R^7$, $R^{7'}$ and $R^{7''}$ represents hydrogen, methyl, ethyl, n-butyl, iso-butyl, tert-butyl, iso-propyl, thexyl, phenyl, branched alkyl or lower alkyl;

b) an attachment to a surface group through a direct carbon-carbon bond formation or through a heteroatom, ester, ether, thioether, amine, amide, imide, urea, carbonate, carbamate, heterocycle, triazole, or urethane linkage; or c) an adsorbed, surface group that is not covalently attached to the surface of the material;

Y' represents a direct bond; a heteroatom linkage; an ester linkage; an ether linkage; a thioether linkage; an amine linkage; an amide linkage; an imide linkage; a urea linkage; a thiourea linkage; a carbonate linkage; a carbamate linkage; a heterocycle linkage; a triazole linkage; a urethane linkage; a diol linkage; a polyol linkage; an oligomer of styrene, ethylene glycol, or propylene glycol; a polymer of styrene, ethylene glycol, or propylene glycol; a carbohydrate group, a multi-antennary carbohydrates, a dendrimer or dendrigraphs, or a zwitterion group; and A represents attachment to the encapsulating material by a ionic group, non-covalently attachment group or by a direct bond including (but not limited to): a heteroatom linkage; an ester linkage; an ether linkage; an thioether linkage; an amine linkage; an amide linkage; an imide linkage; a urea linkage; a thiourea linkage; a carbonate linkage; a carbamate linkage; a heterocycle linkage; a triazole linkage; a urethane linkage; a diol linkage; a polyol linkage; an oligomer of styrene, ethylene glycol, or propylene glycol; a polymer of styrene, ethylene glycol, or propylene glycol; a carbohydrate group, a multi-antennary carbohydrates, a dendrimer or dendrigraphs, or a zwitterion group.

Example 9

The product of Examples 1-8 is modified to combine within a separation device with a second material of workflow importance. For example, the materials of example 2-4 having trypsin encapsulated on the surface of a co-polymeric particle is mixed with a secondary particle that has immobilized on its surface Protein A. The composition of the Protein A containing material includes, but is not limited to: Porous Hybrid Organic/Inorganic materials, polymers, sephadex, agarose, cellulose, carbohydrate based, plant based, see-weed based, DVB, PS, DVB/PS, Methacrylate, nonporous and porous. The size of the Protein A containing materials can be larger or smaller than the scaffolding material, but needs to be large enough not to elute through the outlet frit of the separation device.

In this workflow an antibody isolation on the Protein A resin occurs in the same separation device as a digestion using the encapsulated trypsin. The trypsin is encapsulated during the loading step of the affinity resin, but is opened during the release of the protein from Protein A. The trypsin can be optimized for high pH performance, neutral or low pH digestion. Ideally the trypsin is optimized for low pH digestion which is the same pH used for release of the protein from the affinity resin. The result of this is low volume release of the affinity corresponding with digestion in the same well. As detailed in Example 3, when the scaffolding material can allow for retention of the generated peptides from the trypsin digestion, an all-in one antibody isolation and digestion device can be realized.

In the case where reduction and alkylation is required, this can be achieved by addition of reduction and alkylation and reduction reagents before or after trypsin digestion. Alternatively the reduction and alkylation reagents can also be encapsulated following the approaches of Examples 1-8. The resulting separation device contains a number of encapsulated reagents and enzymes, allowing for a simplified user workflow. The presence of the scaffolding material prevent loss or leakage of encapsulating material from the separation device and greatly reduce matrix effects, suppression or enhancement effects due to the encapsulating material in subsequent LC/MS analysis.

Example 10

Example 9 is modified to have an immobilized trypsin sorbent and an immobilized protein A sorbent.

Example 11

Example 9-10 are modified to use a 96 well plate format.

Example 12

Examples 9-11 are modified to use in-well plate format and not a flow through device. As such no frits are required and larger and smaller Scaffolding materials can be used.

Example 13

Examples 9-12 are modified to include the use of magnetic particles for the affinity, digestion, or scaffolding material.

Example 14

Examples 9-13 are modified to include other enzymes, including but not limited to PNGase F, pepsin, IdeS, IdeZ.

Example 15

Examples 9-14 are modified to include other affinity resins, including but not limited to: Protein G, Lambda, Kappa, Protein Y, Protein L, aptamers, affimers, amyloids, lectins, or activated resins for user generated affinity phases such as streptavidin and epoxy.

Example 16

Examples 1-15 are modified to be included in a digestion then affinity workflow, such as SISCAPA (U.S. Pat. Nos. 9,274,124; 9,261,506; 9,170,263; 9,163,276; 9,018,580; 8,916,680; 8,633,031; 8,580,491; 8,574,860; 8,569,071; 8,568,988; 8,455,202; 8,187,893; 8,119,356; 8,097,425; 7,955,810; and 7,807,172).

Example 17

Examples 1-16 are modified to have a non-covalent interaction between the encapsulating material and the scaffolding material, including but not limited to: ionic interactions, acid-base interaction, Van de Waals interaction, dipole interaction, magnetic attraction, aromatic interaction and hydrophobic interaction.

Example 18

Porous, co-polymeric spherical particles with an average particle size of 60 μm are prepared following the process detailed in Example 1. To these materials are adsorbed through a process of solvent evaporation, a low level of trypsin. An encapsulating shell is then formed around the particle, encapsulating trypsin within the pores of the particle. The trypsin is adsorbed to the co-polymeric particle and is not covalently attached. The trypsin is protected within the encapsulated shell and displays improved storage stability. The trypsin is later released in a protein digestion workflow, as detailed above.

Example 19

The trypsin adsorbed in the co-polymeric particle having an encapsulating shell, as detailed in Example 18, results in the formation of a non-porous material, as determined by Nitrogen sorption analysis.

Example 20

The trypsin adsorbed in the co-polymeric particle having an encapsulating shell, as detailed in Example 18, results in the formation of a porous material, as determined by Nitrogen sorption analysis.

Example 21

To these porous materials of Example 20 are adsorbed protein alkylation reagents, followed by the formation of a secondary encapsulating shell. This secondary shell has a different release trigger than the primary encapsulating shell prepared in Example 18. The alkylating reagent is protected within the encapsulated shell and has no reactivity or interaction with the trypsin contained in the primary encapsulated shell, and displays improved storage stability. The alkylation reagent is later released in a protein digestion workflow, as detailed above.

Example 22

To the materials of Example 21 are adsorbed protein reduction reagents, followed by the formation of a tertiary encapsulating shell. This tertiary shell has a different release trigger than the primary and secondary encapsulating shells prepared in Example 18 and 21. The reduction reagent is protected within the encapsulated shell and has no reactivity or interaction with the alkylation reagent or trypsin contained in the secondary or primary encapsulated shells, and displays improved storage stability. The reduction reagent is later released in a protein digestion workflow, as detailed above.

Example 23

The process of example 18-22 is applied to different enzymes and reagents, resulting in the formation of two or more reagents encapsulated within two or more encapsulating shell layers, within a porous material.

Example 24

Examples 1-23 are modified to be included in a protein deglycosylation workflow (for example, see the workflows as laid out in Waters' application note: Rapid Preparation of Released N-Glycans for HILIC Analysis Using a Novel Fluorescence and MS-Active Labeling Reagent, Library Number: APNT134829002, Part Number: 720005275EN; Anal. Chem., 2015, 87 (10), pp 5401-5409); Prozyme Application Notes TN 2001 and TN2002).

Example 25

Porous, spherical particles with an average particle size of 60 μm are prepared following the process detailed in Examples 1, 4-9. To these materials are adsorbed through a process of solvent evaporation, a low level of PNGase F. An encapsulating shell is then formed around the particle, encapsulating PNGase F within the pores of the particle. The PNGase F is adsorbed to the co-polymeric particle and is not covalently attached. The PNGase F is protected within the encapsulated shell and displays improved storage stability. The PNGase F is later released in a glycoprotein analysis workflow, as detailed above.

Example 26

Porous, spherical particles with an average particle size of 60 μm are prepared following the process detailed in Examples 1, 4-9. To these particles are covalently attached reactive groups (reducing agents, alkylating agents, chloroformate esters, acyl chlorides) or proteins, using methods known in the art. The entire system is then encapsulated by the methods listed above. When ready for use, the encapsulating material is degraded, swelled, made porous, or otherwise altered to make the reactive agents or proteins accessible.

Example 27

Examples 1-26 are modified to be included in a workflow for the modification of glyphosate and other highly polar compounds (for example, see Journal of Chromatography and Separation Techniques Vol 8, Issue 1, Pages 1000346/1-1000346/6).

Example 28

The materials of example 1-26 are used in different devices and workflows, as detailed in FIGS. 4-10.

Example 29

Porous, spherical particles (the scaffolding material) with an average particle size of 60 μm are prepared following the process detailed in Examples 1, 4-9. Onto these materials a reactive fluorescent and MS active tag (reactive group) such as WATERS TECHNOLOGIES CORPORATION RAPIFLUOR-MS™, or PROZYME GYKOPREP® INSTANTAB™ or GYKOPREP® INSTANTPC™. An encapsulating shell is then formed around the particle, encapsulating the enzyme and/or reactive groups on the surface of, or within the pores of the scaffolding material. A second encapsulation material, containing PNGase F is added around the first. The enzymes and reactive groups are protected within the encapsulated shell and displays improved storage stability. These groups are later exposed/released for use in the glycoprotein analysis workflow, as detailed above.

Example 30

Porous, spherical particles (the scaffolding material) with an average particle size of 60 μm are prepared following the process detailed in Examples 1, 4-9. An encapsulating material containing workflow reagents (proteins, reactive groups, etc) is coated or formed around the surface of the scaffolding material. The encapsulating material is then covalently attached to the surface of the scaffolding material. When ready for use, the encapsulating material is degraded, swelled, made porous, or otherwise altered to either release, or make the reactive agents or proteins accessible.

INCORPORATION BY REFERENCE

The entire contents of all patents, published patent applications, and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

What is claimed is:

1. An encapsulated workflow reagent comprising an encapsulating material, a workflow reagent encapsulated within the encapsulating material, and a scaffolding material, wherein the encapsulating material is attached to a surface of the scaffolding material, wherein the scaffolding material is a non-porous solid, wherein the workflow reagent is an enzyme, and wherein the encapsulating material is made with one or more polymers configured to provide a controlled release of the workflow reagent, wherein the encapsulating material is covalently attached to a surface of the scaffolding material and wherein the encapsulated workflow reagent has the formula $[(B)-(Y)_n)]_o$-EM (Formula I), wherein EM represents the encapsulating material;
B represents the scaffolding material;
Y is a linker group between the encapsulating material and a surface of the scaffolding material;
o is an integer greater than 0; and
n is an integer greater than or equal to 1.

2. The encapsulated workflow reagent according to claim 1, wherein the linker group is of the formula represented by Formula II

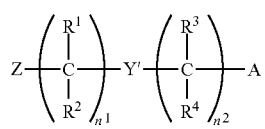

Formula II wherein
$n^1$ an integer from 0-30;
$n^2$ an integer from 0-30;
each occurrence of $R^1$, $R^2$, $R^3$ and $R^4$ independently represents hydrogen, fluoro, methyl, ethyl, n-butyl, t-butyl, i-propyl, lower alkyl, a protected or deprotected alcohol, a zwitterion, or a group Z;
Z represents:
a) a surface attachment group having Formula III:

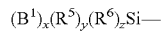

Formula III wherein x is an integer from 1-3, y is an integer from 0-2,
z is an integer from 0-2,
and x+y+z=3
each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group;
$B^1$ represents —$OR^7$, —$NR^{7'}R^{7''}$, —$OSO_2CF_3$, or —Cl; where each of $R^7$, $R^{7'}$ and $R^{7''}$ represents hydrogen, methyl, ethyl, n-butyl, iso-butyl, tert-butyl, iso-propyl, thexyl, phenyl, branched alkyl or lower alkyl;
b) an attachment to a surface group through a direct carbon-carbon bond formation or through a heteroatom, ester, ether, thioether, amine, amide, imide, urea, carbonate, carbamate, heterocycle, triazole, or urethane linkage; or
c) an adsorbed, surface attachment group that is not covalently attached to the surface of the encapsulating material;
Y' represents a direct bond; a heteroatom linkage; an ester linkage; an ether linkage; an thioether linkage; an amine linkage; an amide linkage; an imide linkage; a urea linkage; a thiourea linkage; a carbonate linkage; a carbamate linkage; a heterocycle linkage; a triazole linkage; a urethane linkage; a diol linkage; a polyol linkage; an oligomer of styrene, ethylene glycol, or propylene glycol; a polymer of styrene, ethylene glycol, or propylene glycol; a carbohydrate group, a multi-antennary carbohydrates, a dendrimer or dendrigraphs, or a zwitterion group; and
A represents attachment to the encapsulating material by an ionic group, non-covalently attachment group or by a direct bond including: a heteroatom linkage; an ester linkage; an ether linkage; an thioether linkage; an amine linkage; an amide linkage; an imide linkage; a urea linkage; a thiourea linkage; a carbonate linkage; a carbamate linkage; a heterocycle linkage; a triazole linkage; a urethane linkage; a diol linkage; a polyol linkage; an oligomer of styrene, ethylene glycol, or propylene glycol; a polymer of styrene, ethylene glycol, or propylene glycol; a carbohydrate group, a multi-antennary carbohydrates, a dendrimer or dendrigraphs, or a zwitterion group.

3. The encapsulated workflow reagent according to claim 1, wherein the workflow reagent is released over a period of time.

4. The encapsulated workflow reagent according to claim 1, wherein the encapsulating material comprises a primary encapsulation shell that further encapsulates one or more additional encapsulation shells comprising one or more independent workflow reagents.

5. The encapsulated workflow reagent according to claim 4, wherein the one or more additional encapsulation shells are in the form of microcapsules separately contained within the primary encapsulation shell.

6. The encapsulated workflow reagent according to claim 5, wherein the one or more additional workflow reagents are released at the same time.

7. The encapsulated workflow reagent according to claim 5, wherein the one or more additional workflow reagents are released sequentially.

8. The encapsulated workflow reagent according to claim 4, wherein the one or more additional encapsulation shells are in the form of concentric encapsulation shells such that the workflow reagents are sequentially released.

9. The encapsulated workflow reagent according to claim 1, wherein the scaffolding material is in the form of particles having an average particle size of about 0.3-100 μm.

10. The encapsulated workflow reagent according to claim 1, wherein the scaffolding material is in the form of particles having an average particle size of about 10-70 μm.

11. The encapsulated workflow reagent according to claim 1, wherein the enzyme is a protease, cellulase, lipase, amylase, glucoamylase, glucose isomerase, xylanase, phytase, arabinanase, polygalacturonase, hydrolase, chymosin, urease, pectinase, beta-gluconase, ligase, glycosidase, polymerase, phosphatase, kinase, exopeptidase, endopeptidase, aminopeptidase, or eramidase.

12. The encapsulated workflow reagent according to claim 1, wherein the enzyme is selected from trypsin, PNGase F, PNGase A, pepsin, chymotrypsin, peptidase, bromelain, papain, IdeS, IdeZ, elastase, carboxypeptidase A, capthepsin D, capthepsin E or mixtures thereof.

13. A flow-through workflow device comprising the encapsulated workflow reagent according to claim 1 and a stationary phase.

14. The flow-through workflow device according to claim 13, wherein the device is a separation device or a capillary biological assay device for mass spectrometry.

15. The flow-through workflow device according to claim 14, wherein the separation device is selected from the group consisting of chromatographic columns, thin layer plates, filtration devices, and sample cleanup devices.

16. The flow-through workflow device according to claim 15, wherein the separation device is a chromatographic column and the chromatographic column is selected from the group consisting of HPLC columns, magnetic bead columns, and capillary columns.

17. The flow-through workflow device according to claim 15, wherein the separation device is a chromatographic column and the chromatographic column is selected from the group consisting of ion-exchange chromatography columns and affinity chromatographic columns.

18. The flow-through workflow device according to claim 15, wherein the separation device is a sample cleanup device and the sample cleanup device comprises a solid phase extraction device.

19. A method for preparing a sample for analysis comprising the steps of:
   providing a flow-through workflow device comprising an encapsulated workflow reagent according to claim 1;
   introducing a sample to the flow-through workflow device; and
   allowing the sample to remain with the encapsulated workflow reagent for sufficient time to release the encapsulated workflow reagent.

20. The method for preparing a sample for analysis according to claim 19, further comprising adding a pore forming agent to induce release of the encapsulated workflow reagent.

* * * * *